(12) United States Patent
Nalchadzhi

(10) Patent No.: US 10,078,624 B2
(45) Date of Patent: Sep. 18, 2018

(54) METHOD OF GENERATING HIERARCHICAL DATA STRUCTURE

(71) Applicant: YANDEX EUROPE AG, Lucerne (CH)

(72) Inventor: Leonid Leonidovich Nalchadzhi, Leningrad Region (RU)

(73) Assignee: Yandex Europe AG, Lucerne (CH)

( * ) Notice: Subject to any disclaimer, the term of this patent is extended or adjusted under 35 U.S.C. 154(b) by 0 days.

(21) Appl. No.: 15/504,786

(22) PCT Filed: Apr. 8, 2015

(86) PCT No.: PCT/IB2015/052546
§ 371 (c)(1),
(2) Date: Feb. 17, 2017

(87) PCT Pub. No.: WO2016/103055
PCT Pub. Date: Jun. 30, 2016

(65) Prior Publication Data
US 2017/0364487 A1  Dec. 21, 2017

(30) Foreign Application Priority Data
Dec. 25, 2014 (RU) ................. 2014152871

(51) Int. Cl.
*G06F 17/30* (2006.01)
*G06F 17/00* (2006.01)
*G06F 17/22* (2006.01)

(52) U.S. Cl.
CPC ........ *G06F 17/2241* (2013.01); *G06F 17/227* (2013.01); *G06F 17/2247* (2013.01); *G06F 17/30327* (2013.01); *G06F 17/30589* (2013.01)

(58) Field of Classification Search
CPC ........ G06F 17/30917; G06F 17/30569; G06F 17/30595; G06F 17/3061; G06F 17/30914;
(Continued)

(56) References Cited

U.S. PATENT DOCUMENTS 6,366,934 B1 * 4/2002 Cheng ............... G06F 17/30011
707/999.2
7,451,144 B1   11/2008 Koudas et al.
(Continued)

FOREIGN PATENT DOCUMENTS

RU   2433467 C1    11/2011
WO   2008107259 A1  9/2008

OTHER PUBLICATIONS

English abstract of RU2433467 retrieved from Espacenet on Jul. 13, 2017.
(Continued)

*Primary Examiner* — Yicun Wu
(74) *Attorney, Agent, or Firm* — BCF LLP

(57) ABSTRACT

There is disclosed a computer-implemented method for generating a hierarchical data structure. The computer-implemented method can be executable at a server. The computer implemented method comprises: identifying a plurality of data elements to be searched, the plurality of data elements having a set of descriptors, each descriptor within the set of descriptors being associated with a data type being different from data types of other descriptors within the set of descriptors; defining the hierarchical data structure, having a first level and a second level.

18 Claims, 10 Drawing Sheets

(58) Field of Classification Search
CPC ............... G06F 17/2247; G06F 17/30; G06F 17/30241; G06F 17/30427; G06F 17/30893; G06F 21/604; G06F 17/2258; G06F 17/2264; G06F 17/30424; G06F 17/30442; G06F 17/3089; G06F 17/30958; G06F 11/1435; G06F 12/0253; G06F 17/211; G06F 17/218; G06F 17/227; G06F 17/272; G06F 17/30067; G06F 17/30294; G06F 17/30321; G06F 17/30404; G06F 17/30454; G06F 17/30607; G06F 17/30908; G06F 17/3092

See application file for complete search history.

(56) References Cited

U.S. PATENT DOCUMENTS

| | | | |
|---|---|---|---|
| 7,469,255 | B2 | 12/2008 | Kusterer et al. |
| 7,752,192 | B2 | 7/2010 | Gu et al. |
| 8,868,482 | B2 * | 10/2014 | Murthy ............. G06F 17/30914 707/601 |
| 9,805,076 | B2 * | 10/2017 | Yalamanchi ...... G06F 17/30507 |
| 2002/0193981 | A1 | 12/2002 | Keung et al. |
| 2006/0239562 | A1 | 10/2006 | Bhattacharyay et al. |
| 2006/0282437 | A1 | 12/2006 | Balasubramanian |
| 2007/0260595 | A1 | 11/2007 | Beatty et al. |
| 2009/0077625 | A1 | 3/2009 | Van Der Linden et al. |
| 2009/0083675 | A1 | 3/2009 | Gofer et al. |
| 2009/0248712 | A1 | 10/2009 | Yuan |
| 2009/0259679 | A1 | 10/2009 | Thiesson et al. |
| 2010/0194608 | A1 | 8/2010 | Artan et al. |
| 2011/0173527 | A1 | 7/2011 | Zunger |
| 2011/0314012 | A1 | 12/2011 | Kenthapadi et al. |
| 2013/0226966 | A1 | 8/2013 | Shmueli et al. |

OTHER PUBLICATIONS

International Search Report from PCT/IB2015/052546, Copenheaver, Blaine, dated Aug. 28, 2015.

International Preliminary Report on Patentability from PCT/IB2015/052546, Dinh, Khanh, dated Dec. 4, 2015.

\* cited by examiner

US 10,078,624 B2

METHOD OF GENERATING HIERARCHICAL DATA STRUCTURE

CROSS-REFERENCE

The present application claims priority to Russian Patent Application No. 2014152871, filed Dec. 25, 2014, entitled "METHOD OF GENERATING HIERARCHICAL DATA STRUCTURE" the entirety of which is incorporated herein.

FIELD

The present technology relates to hierarchical data structures, and more specifically to a method of generating hierarchical data structure.

BACKGROUND

Various global or local communications networks (the Internet, the World Wide Web, local area networks and the like) offer a user a vast amount of information. The information includes a multitude of contextual topics, such as but not limited to, news and current affairs, maps, company information, financial information and resources, traffic information, games and entertainment related information. Users use a variety of client devices (desktop, laptop, notebook, smartphone, tablets and the like) to have access to rich content (like images, audio, video, animation, and other multimedia content from such networks).

One of the popular services is an electronic bulletin board. Such boards may comprise ads about sale of cars (new and used), real estate property (homes, apartments, etc.) with different attributes. For example, ads about cars may contain such attributes as a brand, a model, a year of production, etc. Ads about real estate objects may contain such attributes as build year, size of an object or an apartment, a number of rooms, etc.

Users use these boards for browsing advertisements associated with goods or services that they are interested in. They can search ads using several tools available to them: sorting (by time of adding, by price, etc.), using filters that allow them to specify criteria of searching, etc. Filters are useful instrument especially in those circumstances, where board contain several ads and a given user knows parameters of an object she's looking for.

Every category of ads in the electronic bulletin board (such as cars, apartments, etc.) may contain hundreds of thousands of ads, saved in a dedicated storage in a form of raw data or in a form of a hierarchical data structure. It's simpler to save information in a form of raw data, but organized data structures offer certain benefits, especially during the data searching stage, as they generally allow for a faster search.

Those skilled in the art known several approaches to transforming raw data into an ordered data structure. Just as a few examples, these approaches include: arrays, lists, trees, graphs. Each of these (and other known) structures have their respective advantages, as well as the associated limitations.

SUMMARY

It is an object of the present technology to ameliorate at least some of the inconveniences present in the prior art.

According to a first broad aspect of the present technology, there is provided a computer-implemented method for generating a hierarchical data structure. The computer-implemented method is executable at a server. The computer-implemented method comprises: identifying a plurality of data elements to be searched, the plurality of data elements having a set of descriptors, each descriptor within the set of descriptors being associated with a data type being different from data types of other descriptors within the set of descriptors; defining the hierarchical data structure, having a first level and a second level, the first level accommodating a parent node and the second level accommodating a first child node and a second child node both dependent from the parent node; the parent node for storing a first descriptor from the set of descriptors, the first descriptor associated with one or more data elements of the plurality of data elements, the descriptor being of a first data type; and each of the first child node and the second child node for storing a respective second descriptor of the respective one of the one or more data elements; the respective second descriptor being of the same second data type, the same second data type being different from the first data type.

In some embodiments of the method, the parent node is a first parent node, and the defining the hierarchical data structure further comprises defining a second parent node for storing a descriptor from the set of descriptors; the descriptor being different from the descriptor of a first parent node; both descriptors being of the same first data type.

In some embodiments of the method, the defining the hierarchical data structure further comprises defining a third child node and a fourth child node, both dependent from the second parent node; each of the third child node and the fourth child node for storing a respective other descriptor of the other ones of the one or more data elements; the respective other descriptor being of the same second data type.

In some embodiments of the method, the defining the hierarchical data structure further comprises defining a third level accommodating a first sub-child node and a second sub-child node both dependent from the first child node; each of the first sub-child node and the second sub-child node for storing a respective third descriptor of the respective one of the one or more data elements; the respective third descriptor being of the same third data type; the same third data type being different from the first data type and the second data type.

In some embodiments of the method, the defining the hierarchical data structure is executed in response to receiving an indication of a data element of the plurality of data elements, the data element to be indexed in the hierarchical data structure, the data element associated with the set of descriptors, the set of descriptors having a first descriptor and a second descriptor.

In some embodiments of the method, in response to receiving an indication of the data element being associated with the first descriptor being of the first data type the defining comprises identifying the parent node at the first level of the hierarchical data structure.

In some embodiments of the method, in response to receiving an indication of the data element being associated with the second descriptor being of the second data type, the defining comprises identifying the first child node at the second level of the hierarchical data structure.

In some embodiments of the method, the data element is the first data element and wherein in response to receiving an indication of a second data element being associated with a second descriptor being of the second data type, the second descriptor being the different from the second descriptor of the first data element the defining comprises identifying the second child node at the second level of the hierarchical data structure.

In some embodiments of the method, the parent node is the first parent node, and wherein in response to receiving an indication of the second data element associated with a descriptor being different from the first descriptor; both descriptors being of the same first data type, the defining further comprises identifying a second parent node at the first level of the hierarchical data structure.

In some embodiments of the method, in response to receiving an indication of the data element being associated with the first descriptor being of the first data type, a second descriptor being of the second data type and a third descriptor being of a third data type, the defining further comprises identifying a first leaf node being associated with the first child node; the first leaf node for storing the third descriptor.

In some embodiments of the method, the data element is the first data element, and wherein in response to receiving an indication of a second data element being associated with the same first descriptor and the same second descriptor as the first data element, but a different third descriptor of the same third data type, the defining further comprises associating the second data element with the first leaf node.

In some embodiments of the method, the method further comprises updating the first leaf node with a statistical snapshot of the third descriptor of the first data element and the different third descriptor of the second data element.

In some embodiments of the method, the statistical snapshot includes (i) a number of data elements being associated with the first leaf node, (ii) an indication of a minimum value of one of the third descriptors of the first data element and the second data element; and (iii) an indication of a maximum value of the other one of the third descriptors of the first data element and the second data element.

In some embodiments of the method, in response to receiving an indication of a third data element being associated with the same first descriptor and the same second descriptor as both the first and second data elements, but a different third descriptor of the same third data type, the defining further comprises associating the third data element with the first leaf node.

In some embodiments of the method, the method further comprises updating the statistical snapshot with information associated with the third data element.

In some embodiments of the method, the updating comprises: (i) updating a count within the number of data elements, (ii) determining if the indication of the minimum value and the maximum value needs to be updated based on the value of a third descriptor of the third data element.

In some embodiments of the method, the determining if the indication of the minimum value and the maximum value needs to be updated comprises checking if the value of the third descriptor falls within a range defined between the minimum value and the maximum value.

In some embodiments of the method, responsive to the value of the third descriptor falling outside one of the minimum value and the maximum value, changing the respective one of the minimum value and the maximum value to the value of the third descriptor of the third data element.

In some embodiments of the method, the data element is the first data element, and in response to receiving an indication of a fourth data element being associated with the same first descriptor and a second descriptor being of the same second data type but being different from the second descriptor of the first data element, and a third descriptor being of the same third data type, the defining further comprises identifying a second leaf node being associated with the second child node; the second leaf node for storing the third descriptor associated with the fourth data element.

According to another broad aspect of the present technology, there is provided a method of searching data using the hierarchical data structure. The method comprises receiving a search query having a search parameter; the search parameter being associated with a data type; recognizing a branch in the hierarchical data structure; the branch comprising at least one node associated with a descriptor being of the same data type; the descriptor matching with the search parameter; accessing a leaf node associated with the branch, the leaf node having at least one data element being associated with at least the descriptor; retrieving the at least one data element from the leaf node.

In some embodiments of the method, the at least one node is a parent node, and wherein the branch further comprises a child node dependent from the parent node, the child node being associated with a second descriptor; and wherein the search parameter is a first search parameter being of a first data type, and wherein the search query further comprises a second parameter being of a second data type different from the first data type; and wherein the recognizing is executed in response to the second descriptor matching the second search parameter.

In some embodiments of the method, the child node is a first child node, and wherein the branch further comprises a second child node dependent from the parent node, the second child node being associated with a third descriptor; and wherein the search parameter is a first search parameter being of a first data type, and wherein the search query further comprises a second parameter being of a second data type different from the first data type; and wherein the second descriptor matching the second search parameter and the third descriptor does not match the search parameter; and wherein the recognizing comprises recognizing the branch, the branch including the first child node and not including the second child node.

In some embodiments of the method, the search parameter being a first search parameter being of a first data type, and wherein in response to receiving an indication of the search query having the first parameter and a second parameter being of a second data type being different from the first data type the searching comprises: (i) recognizing the second branch comprising the first parent node and the second child node being dependent from the first parent node; the first parent node being associated with the first descriptor matching with the first search parameter; the second child node being associated with the second descriptor matching with the second search parameter; (ii) accessing a first leaf node being associated with the first branch; (iii) retrieving at least one data element from the second leaf node, the data element being associated with the first descriptor and the second descriptor, both descriptors being responsive to the search query.

In some embodiments of the method, in response to receiving an indication of the search query the searching further comprises retrieving the statistical snapshot from the first leaf node, including the number of data elements in the first leaf node, the minimum value and the maximum value of the third descriptor.

In some embodiments of the method, in response to receiving an indication of the search query the searching further comprises retrieving the statistical snapshot from the second leaf node, including the number of data elements in the second leaf node, the minimum value and the maximum value of the third descriptor.

In some embodiments of the method, in response to receiving an indication of the search query the searching further comprises retrieving the statistical snapshot from the first leaf node and the second leaf node, including the number of data elements in the first leaf node and the second leaf node, the minimum value and the maximum value of the third descriptor in the first leaf node, the minimum value and the maximum value of the third descriptor in the second leaf node.

In some embodiments of the method, the method further comprises determining a total number of data elements both in the first leaf node and the second leaf node, a minimum value of the third descriptor among all data elements both in the first and the second leaf nodes, a maximum value of the of the third descriptor among all data elements both in the first and the second leaf nodes.

According to another broad aspect of the present technology, there is provided a server configured to generate a hierarchical data structure. The server comprises non-transient storage medium for storing computer-executable instructions, which instructions when executed are configured to render the server operable to: identify a plurality of data elements to be searched, the plurality of data elements having a set of descriptors, each descriptor within the set of descriptors being associated with a data type being different from data types of other descriptors within the set of descriptors; define the hierarchical data structure, having a first level and a second level, the first level accommodating a parent node and the second level accommodating a first child node and a second child node both dependent from the parent node; the parent node for storing a first descriptor from the set of descriptors, the first descriptor associated with one or more data elements of the plurality of data elements, the descriptor being of a first data type; and each of the first child node and the second child node for storing a respective second descriptor of the respective one of the one or more data elements; the respective second descriptor being of the same second data type, the same second data type being different from the first data type.

According to another broad aspect of the present technology, there is provided a non-transient storage medium for storing computer-executable instructions, which instructions when executed on a server are configured to render the server operable to: identify a plurality of data elements to be searched, the plurality of data elements having a set of descriptors, each descriptor within the set of descriptors being associated with a data type being different from data types of other descriptors within the set of descriptors; define the hierarchical data structure, having a first level and a second level, the first level accommodating a parent node and the second level accommodating a first child node and a second child node both dependent from the parent node; the parent node for storing a first descriptor from the set of descriptors, the first descriptor associated with one or more data elements of the plurality of data elements, the descriptor being of a first data type; and each of the first child node and the second child node for storing a respective second descriptor of the respective one of the one or more data elements; the respective second descriptor being of the same second data type, the same second data type being different from the first data type.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

Figure 1:
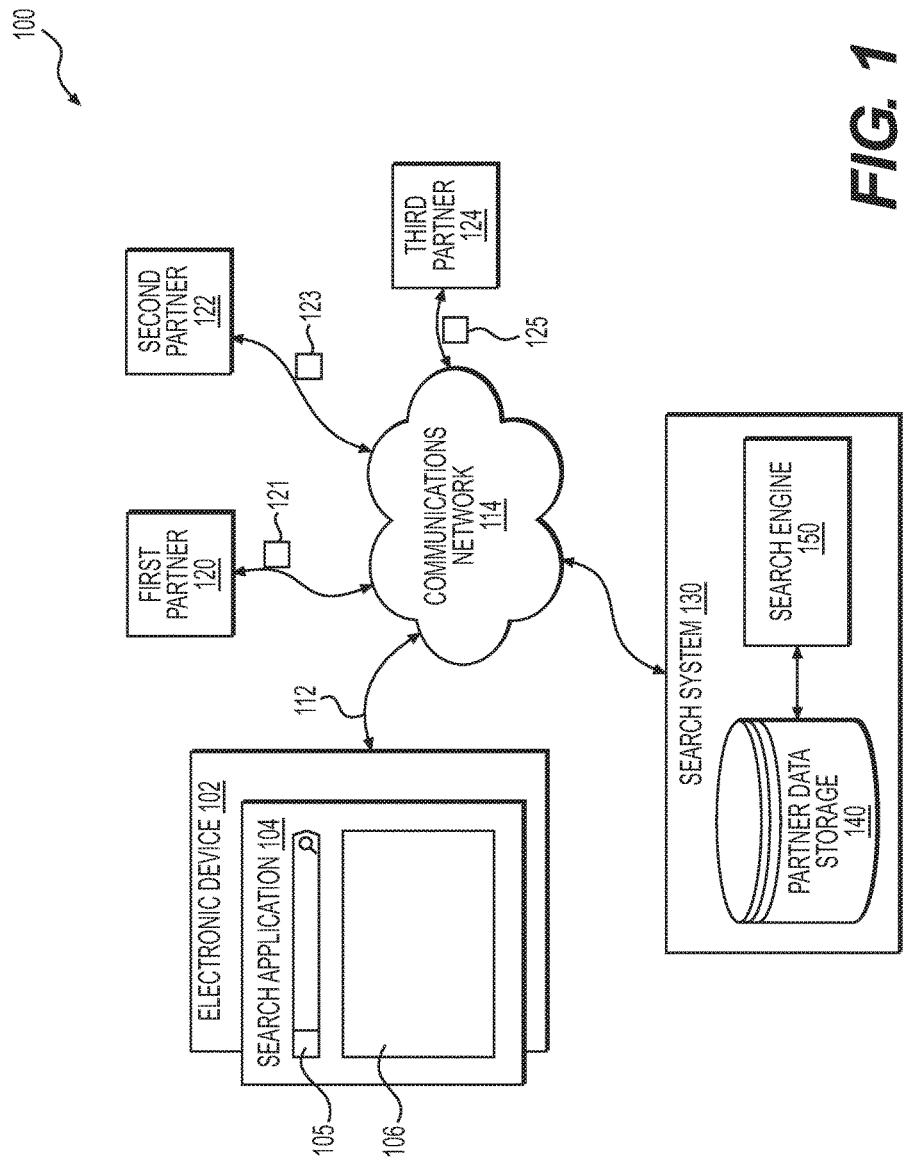
FIG. 1 is a schematic diagram depicting a general structure of a system, the system being implemented in accordance with non-limiting embodiments of the present technology.

Referring to FIG. 1, there is shown a schematic diagram of a system 100, the system 100 being suitable for implementing non-limiting embodiments of the present technology. It is to be expressly understood that the system 100 is depicted as merely as an illustrative implementation of the present technology. Thus, the description thereof that follows is intended to be only a description of illustrative examples of the present technology. This description is not intended to define the scope or set forth the bounds of the present technology. In some cases, what are believed to be helpful examples of modifications to the system 100 may also be set forth below. This is done merely as an aid to understanding, and, again, not to define the scope or set forth the bounds of the present technology. These modifications are not an exhaustive list, and, as a person skilled in the art would understand, other modifications are likely possible. Further, where this has not been done (i.e. where no examples of modifications have been set forth), it should not be interpreted that no modifications are possible and/or that what is described is the sole manner of implementing that element of the present technology. As a person skilled in the art would understand, this is likely not the case. In addition it is to be understood that the system 100 may provide in certain instances simple implementations of the present technology, and that where such is the case they have been presented in this manner as an aid to understanding. As persons skilled in the art would understand, various implementations of the present technology may be of a greater complexity.

The system 100 comprises an electronic device 102. The electronic device 102 is typically associated with a user (not depicted) and, as such, can sometimes be referred to as a "client device". It should be noted that the fact that the electronic device 102 is associated with the user does not need to suggest or imply any mode of operation—such as a need to log in, a need to be registered or the like.

The implementation of the electronic device 102 is not particularly limited, but as an example, the electronic device 102 may be implemented as a personal computer (desktops, laptops, netbooks, etc.), a wireless communication device (a cell phone, a smartphone, a tablet and the like), as well as network equipment (a router, a switch, or a gateway). The electronic device 102 comprises hardware and/or software and/or firmware (or a combination thereof), as is known in the art, to execute a search application 104.

Generally speaking, the purpose of the search application 104 is to enable the user (not depicted) to execute a search. To that end, the search application comprises the a query interface 105 and a search results interface 106. The general purpose of the query interface 105 is to enable the user (not depicted) to enter her search query. The general purpose of the search result interface 106 is to provide search results that are responsive to the search query entered into the query interface 105.

How the search application 104 is implemented is not particularly limited. One example of the search application 104 may be embodied in a user accessing a web site associated with a search engine to access the search application 104. For example, the search application can be accessed by typing in an URL associated with Yandex-.Auto™ search engine at www.auto.yandex.ru. It should be expressly understood that the search application 104 can be accessed using any other commercially available or proprietary search engine.

In alternative non-limiting embodiments of the present technology, the search application 104 may be implemented as a browser application on a portable device (such as a wireless communication device). For example (but not limited) to those implementations, where the electronic device 102 is implemented as a portable device, such as for example, Samsung™ Galaxy™ SIII, the electronic device may be executing a Yandex browser application. It should be expressly understood that any other commercially available or proprietary browser application can be used for implementing non-limiting embodiments of the present technology.

Figure 2:
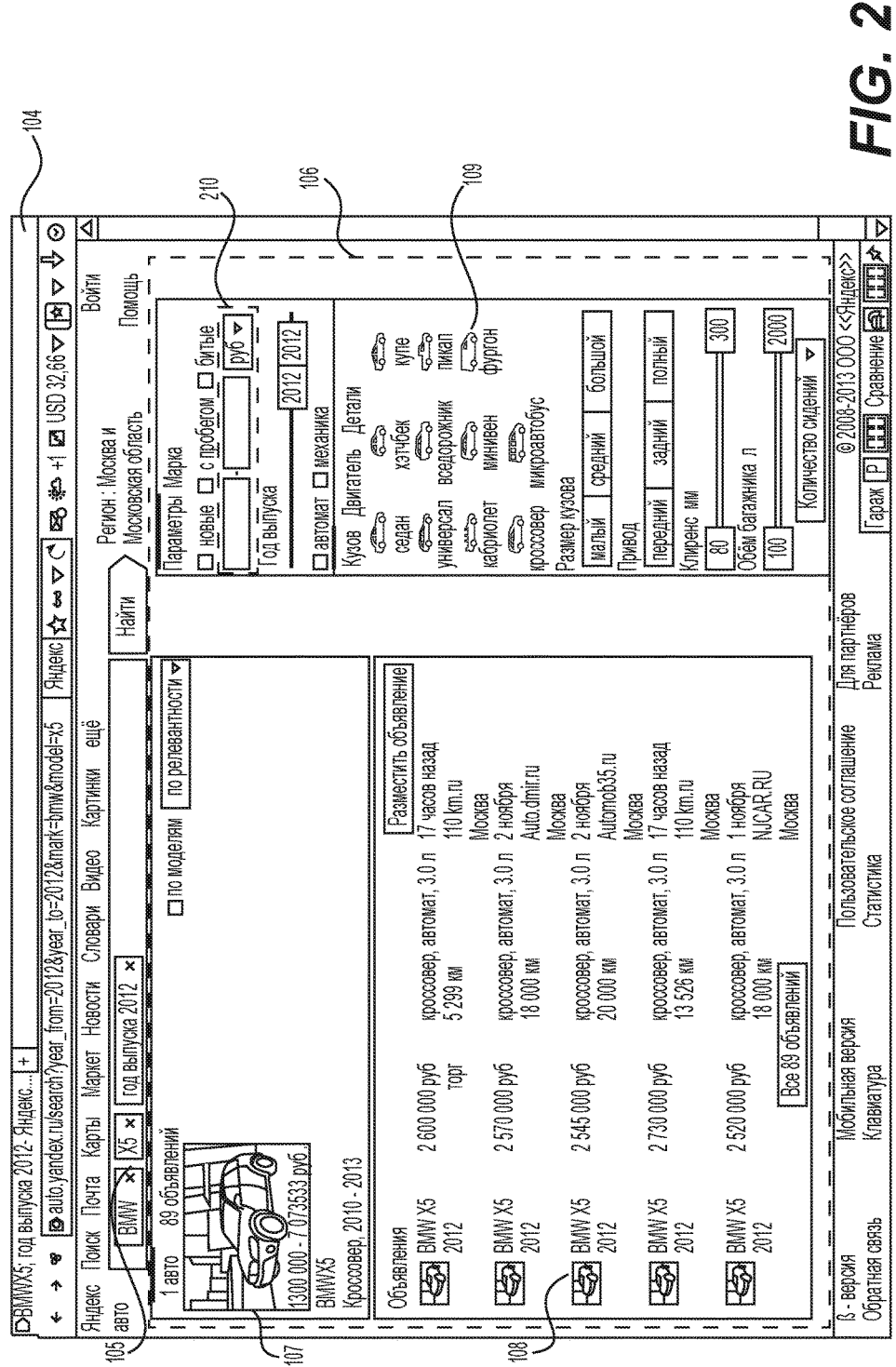
FIG. 2 depicts a search application, the search application executed by an electronic device of the system of FIG. 1, the search application being implemented in accordance with non-limiting embodiments of the present technology.

For the purposes of the examples to be provided herein below, it shall be assumed that a user (not depicted) uses the Yandex.Auto vertical search engine to search for cars for sale. The user may have entered, using the query interface 105, a search query "BMW X5 2012". The user is presented with a Search Engine Result Page (SERP), a screenshot of which is depicted in FIG. 2 as a screenshot of the SERP 200. Within the screenshot depicted at FIG. 2, the user is presented with several conventionally-known fields. Amongst these fields are: the aforementioned query interface 105, the aforementioned search results interface 106, a title field 107, an ad field 108, and a descriptors interface 109.

As has been mentioned above, the general purpose of the query interface 105 is to enable the user to enter her query or a "search string" (which in this case is "BMW X5 2012"). The general purpose of the descriptors interface 109 is to enter one or more additional descriptors or parameters of cars, which can be used as additional search criteria and/or as a filter to narrow the search results that are otherwise responsive to the search query entered using the query interface 105.

Alternatively, the descriptors interface 109 can be used in lieu of the query interface 105 as means for entering user search queries. Alternatively or additionally, one or the other of the query interface 105 and the descriptors interface 109 can be omitted. The general purpose of the search results interface 106 is to provide search results that are responsive to the search query entered into the query interface 105.

In the illustrated example, the SERP 200 contains the title field 107 with a brief description of the BMW X5 (i.e. an object that is responsive to the search query entered into the query interface 105). The SERP 200 further includes the ad field 108, the ad field 108 including a plurality of ads responsive to the search query (i.e. 2012 BMW X5 cars for sale).

The user can choose one of the ads from the plurality of ads within the ad field 108. Upon the user selection of the particular one of the plurality of ads, the full description of the particular selected car can be displayed to the user. Needless to say, the above description of the SERP 200, both the content and the form factor, is provided as examples only. The SERP 200 in accordance with various non-limiting embodiments of the present technology can take other forms and the information presented therein is limited by it being responsive to the search query entered into the query interface 105 and/or descriptors selected in the descriptors field 109.

Returning to the description of FIG. 1, the electronic device 102 is coupled to a communications network 114 via a communication link 112. In some non-limiting embodiments of the present technology, the communications network 114 can be implemented as the Internet. In other embodiments of the present technology, the communications network 114 can be implemented differently, such as any wide-area communications network, local-area communications network, a private communications network and the like.

How the communication link 112 is implemented is not particularly limited and will depend on how the electronic device 1 is implemented. Merely as an example and not as a limitation, in those embodiments of the present technology where the electronic device 102 is implemented as a wireless communication device (such as a smart-phone), the communicated link 102 can be implemented as a wireless communication link (such as but not limited to, a 3G communications network link, a 4G communications network link, a Wireless Fidelity, or WiFi® for short, Bluetooth® and the like). In those examples, where the electronic device 102 is implemented as a notebook computer, the communication link can be either wireless (such as the Wireless Fidelity, or WiFi® for short, Bluetooth® or the like) or wired (such as an Ethernet based connection).

It should be expressly understood that implementations for the electronic device 102, the communication link 112 and the communications network 114 are provided for illustration purposes only. As such, those skilled in the art will easily appreciate other specific implementational details for the electronic device 102, the communication link 112 and the communications network 114. As such, by no means, examples provided herein above are meant to limit the scope of the present technology.

Also depicted within FIG. 1 are a first partner 120, a second partner 122 and a third partner 124, all of them coupled to the communication network 114 via a respective communication link (not separately numbered). It should be noted that the number of partners potentially present within the system 100 is not particularly limited. Given the example mentioned above, it shall be assumed that each of the first partner 120, the second partner 122 and the third partner 124 is desirous of uploading their respective advertisements in respect to the used car sales onto a partner data storage 140 of a search system 130, which search system 130 is also communicatively coupled to the communication network 114.

In some non-limiting embodiments of the present technology, each of the first partner 120, the second partner 122 and the third partner 124 is configured to transmit to the partner data storage 140 a respective feed containing details of the advertisement, the respective feed being a first partner feed 121, a second partner feed 123 and a third partner feed 125. In some non-limiting embodiments of the present technology, each of the first partner feed 121, the second partner feed 123 and the third partner feed 125 can be implemented as an Extensible Markup Language (XML) feed. In other non-limiting embodiments of the present technology, each of the first partner feed 121, the second partner feed 123 and the third partner feed 125 can be implemented in any other suitable commercially available or proprietary format.

Figure 3:
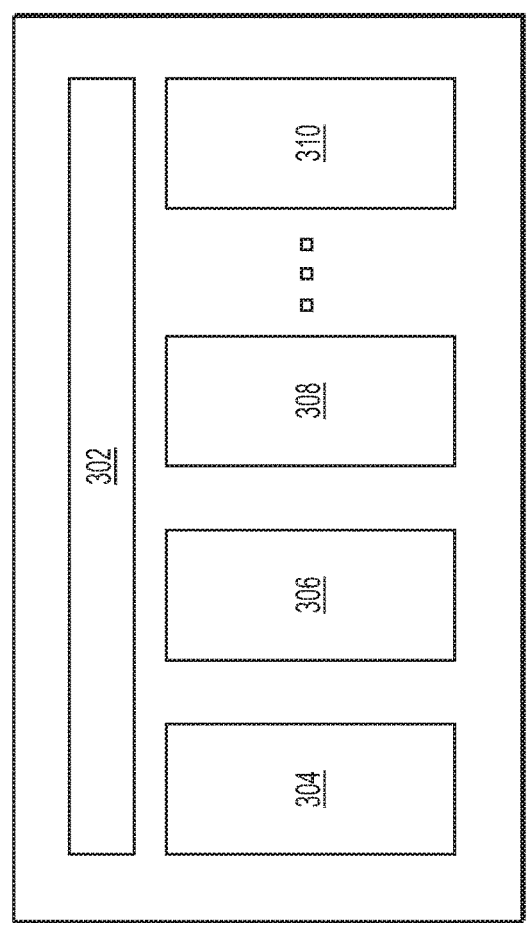
FIG. 3 depicts a schematic representation of content of a first partner message transmitted between components of the system of FIG. 1.

The content of each of the first partner feed 121, the second partner feed 123 and the third partner feed 125 is not particularly limited and will naturally depend on the type of information being maintained within the partner data storage 140. An example of the content of the first partner feed 121, the second partner feed 123 and the third partner feed 125 will be provided with reference to FIG. 3, which depicts the content of the first partner feed 121 (as an illustration only). It should be noted that the remainder of the second partner feed 123 and the third partner feed 125 can be executed in substantially similar (but not necessarily identical) manner.

The first partner feed 121 includes a source indicator 302, which is generally indicative of the identity of the source sending the first partner feed 121. In this example, the source indicator 302 is indicative of the first partner 120 being the source of the first partner feed 121. In some non-limiting embodiments of the present technology, the source indicator 302 can comprise a unique identifier associated with the source of the partner feed, a company name of the source of the partner feed or a Universal Resource Locator (URL) associated with the location of the particular advertisement on the partner web site with which the first partner feed 121 is associated with.

The first partner feed 121 further includes a first advertisement portion 304, a second advertisement portion 306, a third advertisement portion 308 and an $N^{th}$ advertisement portion 310. Naturally, the number of advertisement portions 304, 306, 308, 310 contained in the first partner feed 118 is not limited to those illustrated here. As such, it is foreseeable, that a given one of the first partner feed 121 may include a single instance of the first advertisement portion 304—hence being dedicated exclusively to a single advertisement. On the other end of the spectrum, the given one of the first partner feed 121 may include a plurality of $N^{th}$ advertisement portions 310, each dedicated to the respective advertisement. Therefore, it can be said that the given one of the first partner feeds 121 may be representative of a single advertisement or multiple advertisements.

The content of each of the first advertisement portion 304, the second advertisement portion 306, the third advertisement portion 308 and the $N^{th}$ advertisement portion 310 will depend on the nature of the advertisement, of course. Recalling that in the example we are using here, the advertisement if for used cars for sale, each of the first advertisement portion 304, the second advertisement portion 306, the third advertisement portion 308 and the $N^{th}$ advertisement portion 310 will include some or all of: (i) year of the car; (ii) make of the car; (iii) model of the car; (iv) sales price; (v) an image or images of the car; and (vi) additional information about the car. Naturally, each or some of the each of the first advertisement portion 304, the second advertisement portion 306, the third advertisement portion 308 and the $N^{th}$ advertisement portion 310 can have more or less of the same or of different information.

It should be noted that within the embodiments illustrated above, the first partner feed 121 is associated with a single feed provider (for example, the first partner 120). Naturally, it is possible that a given one of the first partner feed 121, in alternative non-limiting embodiments of the present technology, may in fact be associated with feeds from several partners. As such, it is possible that the given one of the first partner feed 121 may include several ones of the source indicators 302. For example, each source indicator 302 may be associated with the respective one of the first advertisement portion 304, the second advertisement portion 306, the third advertisement portion 308 and the $N^{th}$ advertisement portion 310. Even where the first partner feed 121 is associated with a single feed provider, it may still contain multiple ones of the source indicator 302, each source indicator 302 being associated with the respective one of the first advertisement portion 304, the second advertisement portion 306, the third advertisement portion 308 and the $N^{th}$ advertisement portion 310.

Returning to the description of FIG. 1, the partner data storage 140 is depicted at FIG. 1 as a part of the search system 130 being under a control of a search engine 150. Feeds from partners (i.e. the first partner feed 121, the second partner feed 123 and the third partner feed 125) are transmitted to the search system 130 that stores them in the partner data storage 140. It should be noted that the process of retrieving feeds from partners and saving them in the partner data storage 140 can be organized in different manners.

Even though in the non-limiting embodiment of the present technology depicted in FIG. 1, the partner data storage 140 comprises a single storage entity, in alternative non-limiting embodiments of the present technology, the partner data storage 140 may be implemented in a distributed manner. Just as an example, in alternative non-limiting embodiments of the present technology, the partner data storage 140 may be implemented as a plurality of data storage devices (not depicted), each of the plurality of data storage devices may be associated, for example, with a particular partner and the associated partner's feeds data or a subset of partners and associated partners subsets' feeds.

In some non-limiting embodiments the partner data storage 140 may be implemented in a form of a separate cluster of servers (not depicted), storing feeds in a database. As an example, the cluster may include one or more servers. The database may be implemented in a form of a single storage device or in a distributed manner. Servers of the cluster may retrieve feeds from partners 120, 122, 124 via the communications network 114 or via the search engine 150, which is described below. An alternative non-limiting implementation of the partner data storage 140 is a distributed database comprising a plurality of data storage devices (not depicted), each of the plurality of data storage devices may be associated, for example, with a particular partner.

It should also be noted that the term "partner" in the term "partner data storage" or "partner feed" should not be used to imply any sort of special relationship between the source of the data in the partner data storage 140 and an operator operating the search engine 150. For example, in some non-limiting embodiments of the present technology, the partner data storage 140 may store data from multiple sources, each source not having any particular relationship with the operator operating the search engine 150. In those examples, each source may upload their data onto the partner data storage 140 without having to first enter into any business relationship with the operator operating the search engine 150.

In other non-limiting embodiments of the present technology, the partner data storage 140 may store data from multiple sources, each source (or at least some of the sources) having entered into an arrangement with the operator operating the search engine 150. How this arrangement is structured is not particularly limited and may include an unpaid subscription by the source of data, paid subscription by the source of data, subscription in exchange for provision of banner ads or even a "reverse payment" subscription, where the source of data gets paid for uploading their data onto the partner data storage 140.

Furthermore, in some non-limiting embodiments of the present technology, the partner data storage 140 may be under ownership and/or operation and/or control of the same entity as the operator operating the search engine 150. In alternative non-limiting embodiments of the present technology, the partner data storage 140 may be under be under ownership and/or operation and/or control of an entity different than the one controlling the operator of the search engine 150. In those examples, the partner data storage 140 may be under ownership and/or operation and/or control of one of the entities uploading the data onto the search engine 150 (who would act as an aggregator of feeds from various sources) or a third party entity, who would act as an aggregator of data from multiple sources.

The data maintained on the partner data storage 140 may take many forms. Therefore, the content of the partner data storage 140 or the partner feeds distributed therefrom (as will be described herein below) does not have to be construed as a limitation of embodiments of the present technology. In some non-limiting embodiments of the present technology, data maintained within the partner data storage 140 can be advertisement for various goods or services. As an example and merely for the purposes of illustrating various non-limiting embodiments of the present technology, it shall be assumed that the partner data storage 140 maintains data representative of advertisements for used cars for sale. Needless to say, data stored in the partner data storage 140 and the associated partner feeds may include news feeds, stock exchange feed, RSS feeds and the like.

As has been mentioned above, the search system 130 comprises the aforementioned search engine 150. It should be expressly understood that in order to simplify the description presented herein below, the configuration of the search engine 150 has been greatly simplified. It is believed that those skilled in the art will be able to appreciate implementational details for the search engine 150 and for components thereof that may have been omitted for the purposes of simplification of the description.

Figure 4:
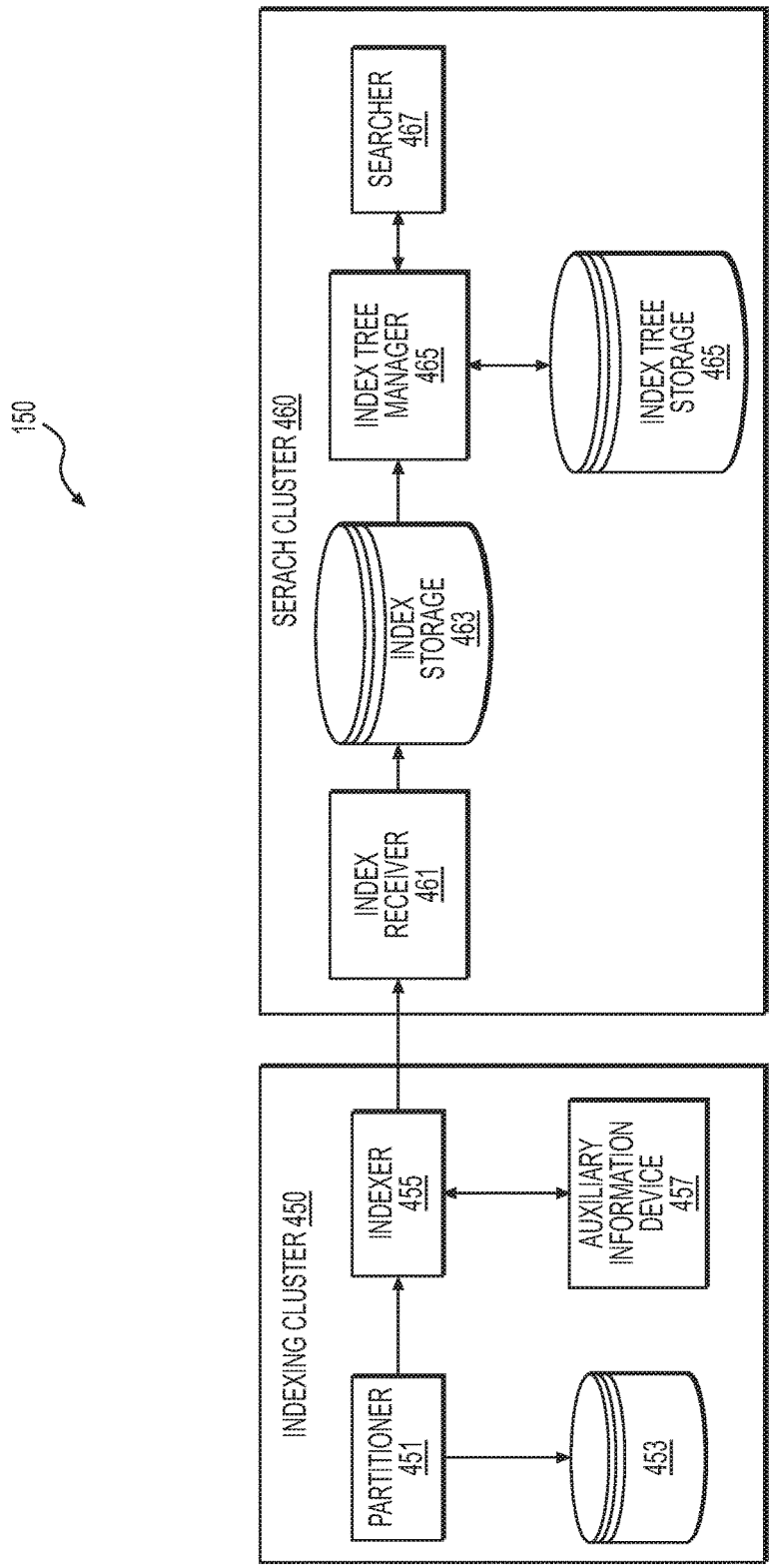
FIG. 4 is a schematic diagram depicting a structure of a search engine of the system of FIG. 1, the search engine being implemented in accordance with non-limiting embodiments of the present technology.

Referring to FIG. 4, there is shown a schematic diagram of the search engine 150, the search engine 150 being suitable for implementing non-limiting embodiments of the present technology. It is to be expressly understood that the search engine 150 is depicted as an illustrative implementation of the present technology. Thus, the description thereof that follows is intended to be only a description of illustrative examples of the present technology.

The search engine 150 can be implemented as a server. Alternatively, the search engine 150 can be implemented in a distributed manner, whereby some or all of the components of the search engine 150 can be distributed. As an example, the non-limiting embodiment of the search engine 150 can be implemented as a Dell™ PowerEdge™ Server running the Microsoft™ Windows Server™ operating system. Needless to say, the search engine 150 can be implemented in any other suitable hardware and/or software and/or firmware or a combination thereof.

In some non-limiting implementation the structure of the search engine 150 consists of two clusters, an indexing cluster 450 and a search cluster 460. The indexing cluster 450 includes a partitioner 451. Generally speaking, the partitioner 451 is configured to maintain a processed partner feeds database 453 (to be described below) with partner feeds, to receive updated partner feeds, to initiate indexing of the updated partner feeds, etc. To that end, the partitioner 451 has access to the partner data storage 140.

The indexing cluster 450 further includes the processed partner feeds database 453. The processed partner feeds database 453 receives from the partitioner 451 and stores processed partner feeds, as will be described in greater detail herein below. The indexing cluster 450 further comprises an indexer 455. Generally speaking, the purpose of the indexer 455 is to create indices based on the new processed partner feeds stored in the processed partner feeds database 453 and to update indices based on the feed updates received from the partner data storage 140.

Even though the indexer 450 is depicted as a single entity, in alternative non-limiting embodiments of the present technology, the indexer 450 can be implemented in a distributed manner. Within those non-limiting embodiments of the present technology, where the indexer 450 is implemented in a distributed manner, the transmission of information between the partitioner 451 and one of the multiple indexers 455 could be implemented by employing load-balancing. In other words, the partitioner 451 may choose one of the available multiple indexers 455 based, for example, on how busy the given one of the multiple indexers 455 is compared to the other ones of the available multiple indexers 455.

Now, the function of the partitioner 451 will be described within the context of the partitioner 451 processing new partner feeds. However, some of the described processes for new partner feeds will apply mutatis mutandis to the receiving and processing updated partner feeds (to be described herein below).

The partitioner 451 receives a feed from the partner data storage 140 (the feed having been uploaded to the partner data storage 140 by one or more of the first partner 120, the second partner 122 or the third partner 124). It should be noted that in some non-limiting embodiments of the present technology, the new (or updated) partner feed retrieved from the partner data storage 140 may be representative of information from a single one of the first partner 120, the second partner 122 and the third partner 124. In alternative non-limiting embodiments of the present technology, the new (or updated) partner feed retrieved from the partner data storage 140 may be representative of information from multiple ones of the first partner 120, the second partner 122 and the third partner 124.

In some non-limiting embodiments of the present technology, the partitioner 451 accesses the partner data storage 140 to retrieve the feed. This accessing can be done on a periodic or random basis, such as for example, every 15 minutes, every hour, every day, every week or Monday, Tuesday and Friday of a given week or any combination thereof. These embodiments can be thought of as a "pull" approach. In alternative non-limiting embodiments of the present technology, the partner data storage 140 may transmit the feed to the partitioner 451. This transmission can likewise be done on periodic or random basis, such as for example, every hour, every day, every week or Monday, Tuesday and Friday of a given week or any combination thereof. These embodiments can be thought of as a "push" approach. Naturally, a combination of a pull and push approaches can also be utilized.

Once the partitioner 451 receives the feed, the partitioner 451 parses the received feed into a plurality of advertisements potentially contained therein. Given the example of the first partner feed 121, the partitioner 451 extracts the source indicator 302 and then parses the first partner feed 121 into a first advertisement containing the first advertisement portion 304, a second advertisement containing the second advertisement portion 306, a third advertisement containing the third advertisement portion 308; and an $N^{th}$ advertisement containing the $N^{th}$ advertisement portion 310.

The partitioner 451 then executes a unification function of each of the so-generated advertisements. More specifically, the partitioner 451 ensures that each of the advertisement contains key field formatted in the same fashion. The unification function can be particularly useful considering that there is no pre-defined format for the submission of the partner feeds. Naturally, where there is a pre-defined format has been established for the submission of the partner feeds, the unification function may be optionally not executed.

For the purposes of the example being presented herein below, the key fields can be "make", "model" and "year" associated with the used car for sale. Naturally, in those embodiments of the present technology where the advertisement contains other type of subject-matter, the key fields will be implemented differently. It should be also noted that the number of the key fields is not limited. Generally speaking, the number and the content of the key fields will be selected such that the key fields identify the subject matter of the advertisement and allow for partitioning thereof, as will be described momentarily.

Generally speaking, the purpose of the indexer 455 is to index the partitions to create a persistent index, which can be used for searching of the advertisements. In some non-limiting embodiments of the present technology, the indexer 455 is configured to index partitions independent from each other. In other non-limiting embodiments of the present technology, the indexer 455 is configured to index the partitions in parallel. In yet further embodiments of the present technology, the indexer 455 is configured to index at least some of the partitions in parallel and independent from each other.

The indexer 455 can then perform one or more of the following operations. In some non-limiting embodiments of the present technology, the indexer 455 prepares the data for indexing. Namely, the indexer 455 can perform one or more of the following functions: (i) de-serializing; (ii) unifying; (iii) validating the partition by checking against business logic; (iv) image processing; (v) calculating static relevancy; (vi) clustering the advertisements; (vii) validation of the cluster volume and (viii) serialization of the processed partitions.

Next, some of these functions will be described in greater detail.

The indexer 455 can perform the process of de-serialization by first converting the received partner feeds from a compact format suitable for transition over a network into a format more suitable for manipulation, as will be explained in further detail below. In some embodiments, the function of de-serializaiton can be executed by the partitioner 451, when the partner feed is first received. The indexer 455 can additionally perform its own de-serialization function.

The indexer 455 can perform the unifying function by translating the key fields of each of the partner fields to a unified format. Within the embodiments being presented herein, the indexer 455 ensures that all of the make, model and year fields are recorded in the same format. To that end, the indexer 455 may have access to a thesaurus or other databases of synonyms. For those partner feeds that, as part of the key fields, contain words that can not be unified, the indexer 455 can simply ignore those partner feeds. In some embodiments, the function of unification can be executed by the partitioner 451, when the partner feed is first received. The indexer 455 can additionally perform its own unification function.

The indexer 455 performs a validation function, namely validating the partition by checking against business logic. In some non-limiting embodiments of the present technology, the indexer 455 aims to determine if any of the advertisement contained within the partitions are either not real, fraudulent or otherwise should not be displayed to the users performing the searches.

The indexer 455 can perform static relevancy calculation by determining how appropriate a given advertisement within the partner feed is. The indexer 455 can employ numerous algorithms for determining the static relevancy, depending on specific business needs. Just as an example, the indexer 455 can determine how many times a given source of partner feeds has been a source of fraudulent or outdated advertisements.

Furthermore, the indexer 455 can perform clustering of the data. In some non-limiting embodiments of the present technology, as part of the clustering function, the indexer 455 analyzes the data to determine if there are any duplicates. Generally speaking, duplicates may occur where the same advertisement has been submitted twice (or multiple times for that matter), which may occur from time to time when an aggregator has reposted the original advertisement from one of the first partner 120, the second partner 122 and the third partner 124. Naturally, duplicate entries may occur for any other reason. If any duplicates are located as part of the clustering function, the indexer 455 may cause removal of the duplicate entries from the processed partner feeds database 453.

The indexer 455 can further perform validation of the cluster volume by determining if a size of a given partition has exceeded a historical average size of partitions. Finally, the indexer 455 can provide serialization of the processed partitions into format suitable for storage and/or transmission.

Also depicted within the illustration of FIG. 4 is an auxiliary information device 457. The auxiliary information device 457 is responsible for obtaining, storing and management of additional information required in administering the processes within the search engine 150. Examples of such information that may be obtained, stored and managed by the auxiliary information device 457 include (but are not limited to): catalogues of various cars, dictionaries for translating and unifying the names, currency exchange rates, regional price schemes and the like. Naturally, in other non-limiting embodiments of the present technology, where the partner feeds are associated with data other than used cars for sale, the auxiliary information device 457 can be configured to obtain, store and manage other sort of information.

Once the indexer 455 has completed processing the data stored in the persistent storage 453, it transmits it to a search cluster 460 and, namely, to an index receiver 461 of the search cluster 460. The index receiver 461 is responsible for receiving the processed partitions from the indexer 455 and to build persistent indexes to enable searching. In some non-limiting embodiments of the present technology, the index receiver 461 first transcodes the received partitions into a search index format, which can be, as an example, the Lucent Document format or any other suitable commercially available or proprietary format.

Once transcoded, the index receiver 461 builds a search index for partitions in an index storage 463. A non-limiting example of the index maintained by the index storage 463 may be expressed as follows:

```
1  /index
2    +--v10 (format version 10)
3    | +-- . . .
4    +--v11 (format version 11)
5      +--p0 (index for partition #0)
6      | +--t12345678 (read-only catalogue of Lucent index, created in UNIX time 12345678)
7      | | +-- . . .
8      | +--t12346789-building (catalogue of Lucent index, built by Index Receiver is
9  invisible to the Searcher)
10     | +-- . . .
       +-- . . .
```

The search index within the index storage 463 is accessible by an index tree manager 465 when building an index tree and saving it in index tree storage 465. An algorithm of this process will be described below. A searcher 467 may ask the index tree manager 465 for receiving data from the index tree storage 465 when executing searches upon request from a frontend device 470.

A search index stored in the index storage 463 is processed by index tree manager 465. The main purpose of this processing is optimization of searching data in index by means of generating hierarchical data structure from data storing in index.

According to the FIG. 4 index tree manager 465 retrieves data from the index storage 463, generates index tree and saves it in the index tree storage 465. Index tree manager 465 may launch this process periodically, for example, every hour. A periodicity may depends on different factors such as frequency of index updates in the index tree storage 465, some technical requirements and other reasons, that may easily understood to those skill in the art.

Just as an example the process of index creation for advertisements of cars is described below. Every ad, as shown above, include some or all of: (i) year of the car; (ii) make of the car; (iii) model of the car; (iv) sales price; (v) an image or images of the car; and (vi) additional information about the car. For example, the data element "car" may have set of descriptors: "BMW", "X5", "2012". Another set of possible descriptors is "Audi", "A6", "2007". The substance describing category of the description is named "data type" in a context of present technology. So, the data element "car" may have descriptors of such data types as "the make of the car", "the model of the car", "the year of the car".

Also in a context of present technology each descriptor within the set of descriptors for one data element is supposed to be associated with a certain data type being different from data types of other descriptors within this set of descriptors.

Figure 5:
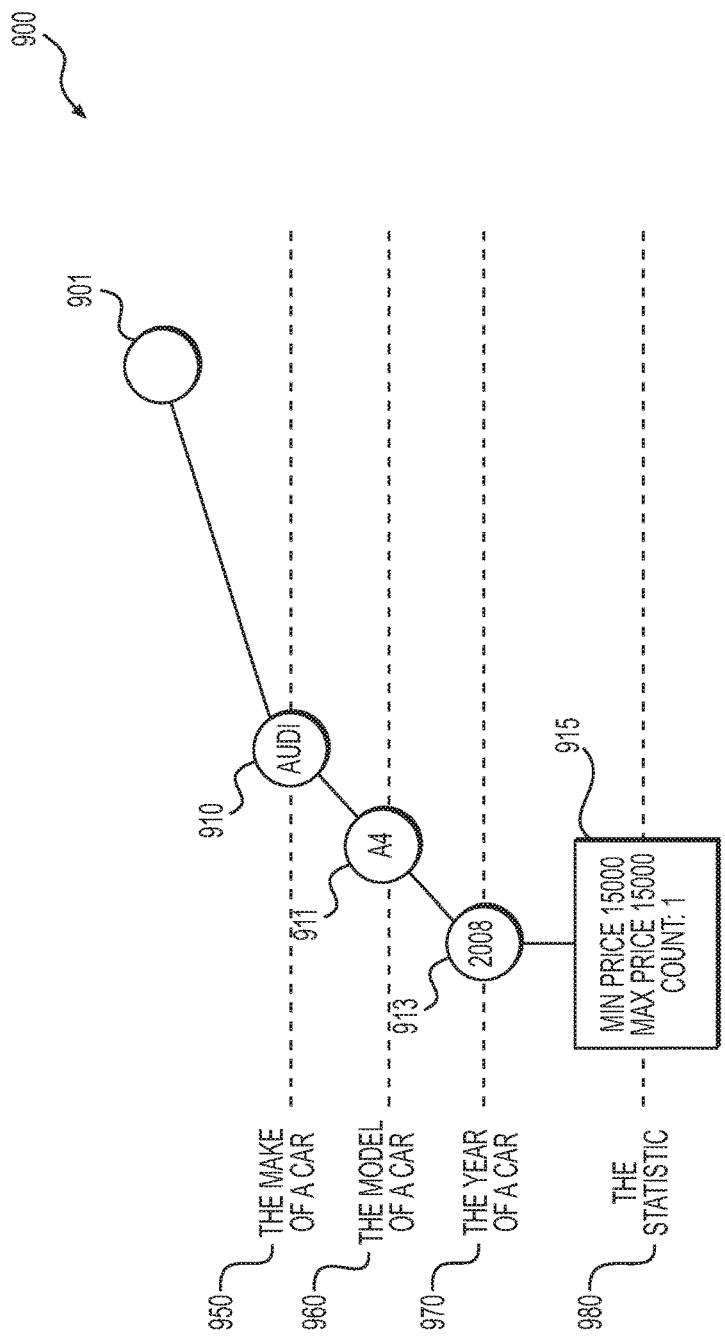
FIG. 5 depicts a schematic diagram of a data tree structure maintained within the search engine of FIG. 4, the data tree structure depicted during a first stage of being populated, the data structure being implemented in accordance with non-limiting embodiments of the present technology.

In some non-limiting implementations of the present technology the simplest example of data tree 900 is depicted in FIG. 5. According to the embodiment of the present technology the data tree 900 has several levels, namely, a first level 950, a second level 960, a third level 970 and a fourth level 980. It should be noted that the exact number of levels is defined by the number of data types.

The process of creating and building the data tree 900 will now be described. Each level of the data tree 900 (the first level 950, the second level 960, the third level 970 and the fourth level 980) is configured to store an element of a data type that is different from data types stored at other levels (the first level 950, the second level 960, the third level 970 and the fourth level 980).

In the depicted example, where the data tree 900 is being built for data elements describing a car, which is described by descriptors being of three data types: "the make of the car", "the model of the car", "the year of the car", the data tree 900 requires three levels associated with these data types, as well as a leaf level.

The definition of the data type for each of the levels of the data tree 900 (the first level 950, the second level 960, the third level 970 and the fourth level 980) can be executed by the index tree manager 465 either randomly (i.e. any order of the make, model and the year of the car) or based on a pre-defined routine.

Within the illustrated embodiment, the index tree manager 465 has associated: the first level 950 with the data type "the make of the car", the second level 960 with the data type "the model of the car" and the third level 970 with the data type "the year of the car". The index tree manager 465 has further associated the fourth level 980, being a leaf node in a particular branch, with statistical information.

It should be noted that number of levels depends on number of data types which are further supposed to use as a criteria of searching for data elements. All data types or only a subset of the data types associated with the data elements to be stored within the data tree 900 may be chosen for identifying the levels of the data tree 900 (the first level 950, the second level 960, the third level 970 and the fourth level 980).

For example it's possible not to use the data type "year of the car" and decrease the number of levels in the data tree 900 to two. If at least one of data elements had the fourth descriptor with a data type being different from data types of other descriptors the fourth level could be also added to the data tree 900.

It should be also noted that an order of levels ("the make of the car"-"the model of the car"-"the year of the car"), described in the example above, is not fixed. Any other order such as "the make of the car"-"the year of the car"-"the model of the car" or "the model of the car"-"the year of the car"-"the make of the car" or "the year of the car"-"the model of the car"-"the make of the car" or other, may be used for the identifying the levels of the data tree 900.

As has been alluded to above, the fourth level 980 is created for the leaf element. Within embodiments of the present technology, the fourth level 980 is used for storing statistical snapshot about data elements maintained within a specific branch of the data tree 900.

In some non-limiting embodiments the statistical snapshot may include descriptors with data types being different from data types of previous levels, for example, a descriptors with a data type "the price of the car", a minimum and a maximum values of this descriptors, a number of data elements maintained within the given branch of the data tree 900.

Generally speaking the statistical snapshot may include different kinds of information such as various descriptors, images, video about appropriate data elements and the like. In various non-limiting embodiments, the leaf node of the fourth level 980 can actually store the statistical information. Alternatively, the leaf node of the fourth level 980 can store a pointer to a place in a memory storage where the statistical information can be stored.

Each level of the data tree 900 accommodates at least one node containing elements of the same data type as all the other nodes at the same level. Just as an illustrative example, if a given level of the: the first level 950, the second level 960, the third level 970 and the fourth level 980 is associated with a data type "the make of the car", the various nodes at the given level may contain one of the descriptors, such as: "Audi", "BMW", "Toyota" and the like.

The nodes in the data tree 900 may be one of four types: root, parent, child and leaf, which are well known from a graph theory. If two nodes have a relationship the node associated with a higher level is typically referred to be a parent node or level, the other one being a child node or level. The general purpose of the root node is to designate the base of the data tree 900.

This root node contains at least one child node, but does not dependent from any parent node. On the other hand, a leaf node is a node associated with the lowest level (i.e. the fourth level 980). The leaf node has a parent node, but has no child nodes. Within the embodiments of the present technology, the leaf node contains a statistical snapshot associated with the elements contained in the branch leading to the leaf node (the branch being a collection of nodes between the root node and the leaf node).

For the purposes of illustrating the process of building the data tree 900, the following sets of descriptors for the data elements to be stored in the data tree 900 will be used:
Data element 1: "Audi"-"A4"-"2008"-"15000"-"black"
Data element 2: "Audi"-"A4"-"2008"-"17000"-"blue"
Data element 3: "Audi"-"A6"-"2007"-"22000"-"red"
Data element 4: "BMW"-"X5"-"2007"-"25000"-"grey".

At the beginning of the building routine (which can be conveniently executed by the index tree manager 465) for the data tree 900, the data tree 900 does not contain any elements. The first step of building is adding a root 901 to the data tree 900. As mentioned above the root 901 is located at the top level of the data tree 900 which is not associated with any data types. So the root 901 is also not associated with any descriptors.

Then the first data element with the set of descriptors "Audi"-"A4"-"2008"-"black"-"15000" can be stored in the data tree 900. The result of this process is schematically depicted at FIG. 5. More specifically, a node 910 is created at the first level 950 of the data tree 900 that is associated with the data type "the make of the car". A descriptor with the data type "the make of the car" is retrieved from the first set of descriptors and is recorded in the node 910. In the example the descriptor "Audi" is stored in the node 910.

A node 911 is created at the second level 960 of the data tree 900, the node 911 being associated with the data type "the model of the car". Hence, the node 911 is associated with the parent node 910. A descriptor with the data type "the model of the car" is retrieved from the first set of descriptors and is recorded in the node 911. In the depicted example the descriptor "A4" is recorded in the node 911.

A node 913 is created at the third level 970 of the data tree 900, the node 913 being associated with the data type "the year of the car". Hence, the node 913 is associated with the parent node 911. A descriptor with the data type "the year of the car" is retrieved from the first set of descriptors and is recorded in the node 913. In the depicted example, the descriptor "2008" is recorded in the node 913.

It should be recalled that the data tree 900 is associated with three levels of nodes and a leaf node associated therewith. In alternative embodiments, where the data tree 900 is associated with more levels, the process of creating nodes can be continued for the n-number of additional levels potentially present within the data tree 900. Just as an example, the fourth level associated with the data type "the color of the car" could be added to the data tree 900. In this case a node "black" (not depicted) from the first set of descriptors would be entered into a fourth level (not depicted) and is associated with the parent node 913.

Now that all the nodes at the levels of the data tree 900 are completed, a leaf 915 is added to the lowest level of the data tree 900 as a child for the parent node 913. The leaf 915 can be thought of as a leaf in a branch made of the root node 901, the node 910, the node 911 and the node 913.

According to embodiments of the present technology, the leaf 915 is configured to store a statistical snapshot for data elements, associated with the set of descriptors "Audi", "A4", "2008" or, in other words, stored in the branch associated with the leaf 915. The snapshot in the leaf 915 may include a number of data elements, a price of the car, an indication of minimum and maximum values of the descriptors being of identical data types. In some non-limiting implementations the leaf 915 may store values of descriptors that were not added to the data tree 900. For example, the descriptor "black" from the set of descriptors for the first data element can be saved in the leaf 915.

Just as an illustration, let's assume that the leaf 915 stores three statistical parameters: minimum and maximum values of the descriptor "the price of the car" and a number of data elements stored in the associated branch. As shall be apparent from the description above, at this stage both the minimum value and the maximum value are equal to the "15000" and the number of data elements is equal to "1".

As is depicted in FIG. 5, a first branch (made up of the root 901, the node 910, the node 911, the node 913 and the leaf 915) has been added to the data tree 900, the adding being a result of storing the first data element.

Figure 6:
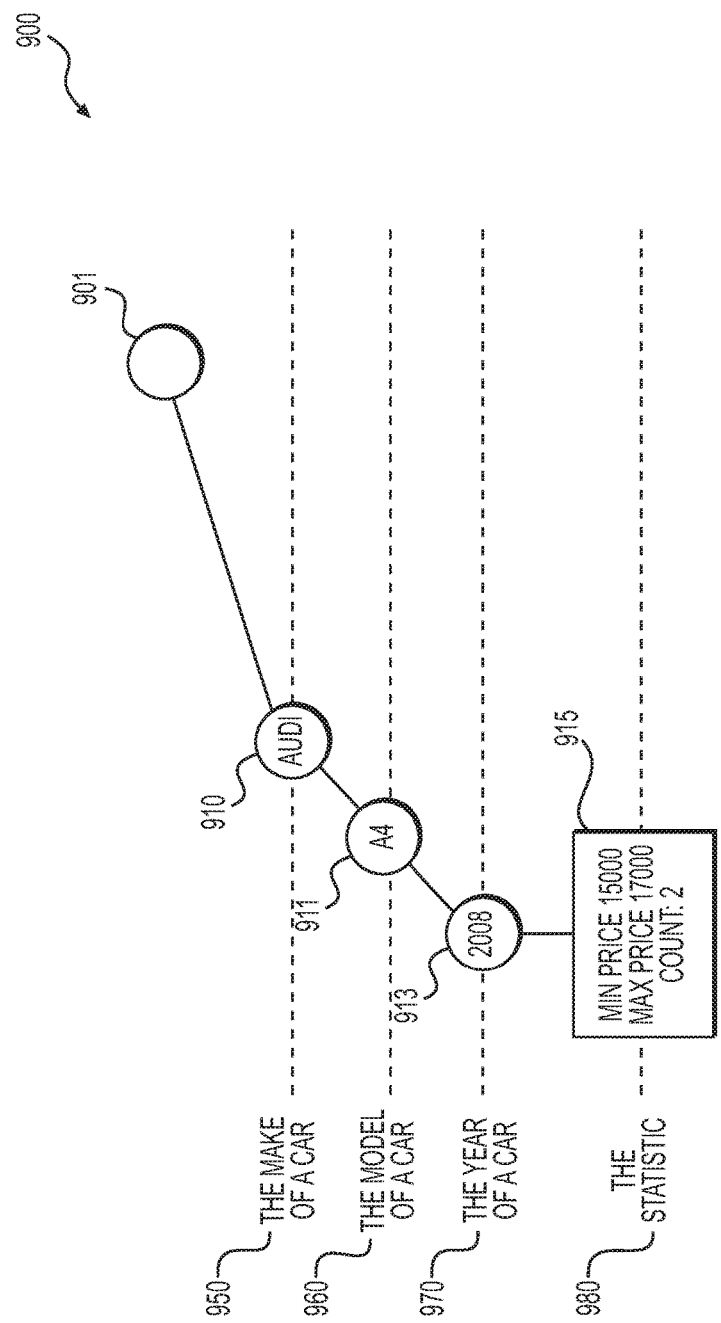
FIG. 6 depicts a schematic diagram of the data tree structure of FIG. 5, the data tree structure depicted during a second stage of being populated.

The next step is storing the second data element described by the set of descriptors "Audi"-"A4"-"2008"-"black"-"17000", the result of this process being depicted in FIG. 6. The routine for storing the additional data elements (such as the second data element) is distinct from the storing of the first element, as the data tree 900 already contains some nodes associated with descriptors from the set. Hence, before adding a descriptor from the set, children for corresponding parent are be checked if a node with the same descriptor as the newly added one has already been created.

If such node does exist, a new node is not added to the data tree 900. If, on the other hand, there is no such previously-created node, a new node is added as a child of the corresponding parent.

According to the example the second data element has the descriptor "Audi" being of a data type "the make of the car". The first level 950 of the data tree 900 associated with this data type already contains the node 910 that is reserved for "Audi" being a child of the root 901. Accordingly, no new node at the first level 950 is added and the routine passes to the second level 960.

The second level 960 is associated with the data type "the model of the car". The descriptors' set of the second element comprises the descriptor "A4" being of this data type. Hence, the routine examines the nodes at the second level 960 for the presence of the node for descriptor "A4". As one can see the descriptor "A4" has been added earlier as the node 911. Hence, the routine does not add any additional nodes at the second level 960 and passes to the third level 970.

The third level 970 is associated with the data type "the year of the car" and the data set of the second data element has the descriptor "2008" being of this data type. Hence, the routine examines the nodes at the third level 970 for the presence of the node for descriptor "2008". As one can appreciate, the node 913 associated with the descriptor "2008" already exists, so the routine does not add additional nodes at the third level 970.

The routine then updates the leaf 915 and, more specifically, updates the statistical snapshot contained therein. The first steps is an updating a count within the number of data elements. The updated count is now "2" and an indication of the count is added to the leaf 915.

The second step in updating the statistical snapshot, is determining if the minimum value or the maximum value need to be updated. This determining is executed based on the values stored in the leaf 915 and the values of the new element being added. More specifically, the minimum value and the maximum value of a descriptor are retrieved from the leaf 915, this descriptor being of the same data type as the descriptor of the newly added element. As mentioned above in the example the leaf 915 contains the minimum value and the maximum value of only one descriptor with the data type "price of the car", so these values are retrieved from the leaf 915.

Then the value of the descriptor is compared with the maximum value and the minimum value. If the value of the descriptor falls outside of a range defined between the minimum value and the maximum value, at least one of the minimum value and the maximum value needs to be updated. The minimum value is set the value of the descriptor, if value of the descriptor less than the minimum value stored in the leaf 915. If the value of the descriptor is more than the maximum value stored in the leaf 915, the maximum value is set to the value of the descriptor.

In the example being described herein, the value of the descriptor is equal to "17000", so this value is set as the new maximum value of the descriptor associated with data type "price of the car" (as it exceeds the previously stored maximum of "15000"). The updated statistical snapshot is recorded in the leaf 915.

Figure 7:
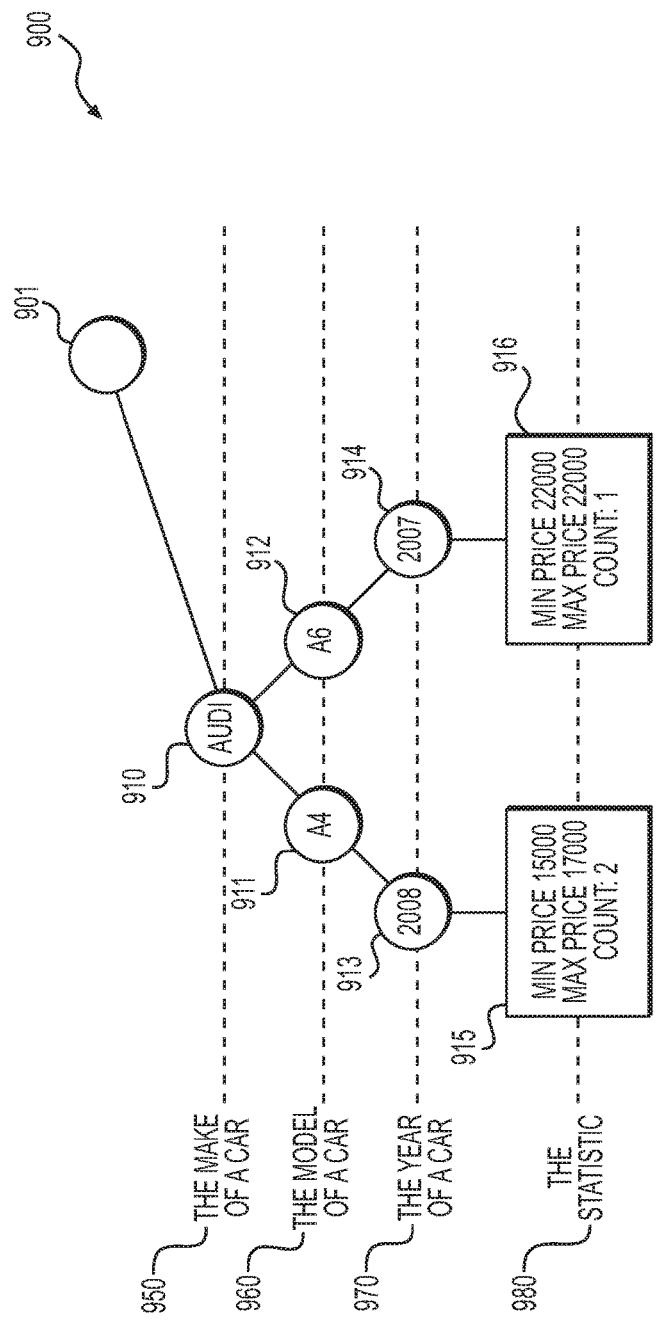
FIG. 7 depicts a schematic diagram of the data tree structure of FIG. 5, the data tree structure depicted during a third stage of being populated.

Now the process of adding a third data element described by the set of descriptors "Audi"-"A6"-"2007"-"22000"-"black" will be described. The result of the update is depicted with reference to FIG. 7. As can be seen, a portion of the descriptors of the third data element overlaps with the set of descriptors of data elements stored in the data tree 900, however only partially.

The third data element has the descriptor "Audi" being of a data type "the make of the car". The routine first checks the nodes of the first level 950 for the existence of the node "Audi". As one can see the node 910 associated with "Audi" exists at the first level 950. Hence, the routine does not add any new nodes to the first level 950.

The second level 960 is associated with the data type "the model of the car". The descriptor "A6" being of this data type is retrieved from the set of descriptors. The routine then checks if the second level 960 contains any nodes that are associated with the descriptor "A6". As can be seen, the descriptor "A6" is new, i.e. the parent node 910 "Audi" does not contain child node associated with the descriptor "A6". So a node 912 associated with the descriptor "A6" is created on the second level 960 as a child node of the parent node 910 "Audi".

The third level 970 is associated with the data type "the year of the car" and the descriptor "2007" being of the same data type can be retrieved from the set of descriptors for the third element. The routine then examines the child nodes of the parent node 912 "A6" for existence of the node associated with the descriptor "2007". Generally speaking the check may be not necessary in this particular case as the parent 912 node "A6" has been just created on the second level 960 and clearly it does not contain any child nodes as of yet.

But in some other non-limiting embodiments, the check can still be executed. For example, the data tree 900 building can be executed by several parallel processes and each of the parallel processes can be executed independently. As such, two or more of the parallel processes can try to add a node (or a child node to the parent node) simultaneously. In these circumstances the check can help to avoid the unnecessary duplication of child nodes.

As such, a node 914 for the parent node 912 "A6" is added to the third level 970 as a node associated with the descriptor "2007".

Since there is no leaf yet associated with the parent node 914, a leaf 916 is added to the parent node 914. The leaf 916 is configured to store a statistical snapshot related to the data elements associated with the set of descriptors: "Audi", "A6", "2007" or, in other words, those stored in the branch of the data tree 900 made of the root 901, the node 910, the node 912 and the node 914. Similar to the leaf 915, the snapshot for the leaf 916 includes a number of data elements, an indication of minimum and maximum values of the descriptors being of identical data types.

The leaf 916 stores the same three statistical parameters as the leaf 915: minimum and maximum values of the descriptor "the price of the car" and a number of data elements. Within the illustrated embodiment and at a stage depicted in FIG. 7, the minimum value and the maximum value should be saved in the second leaf are equal to the "22000" and the number of data elements is equal to "1".

Figure 8:
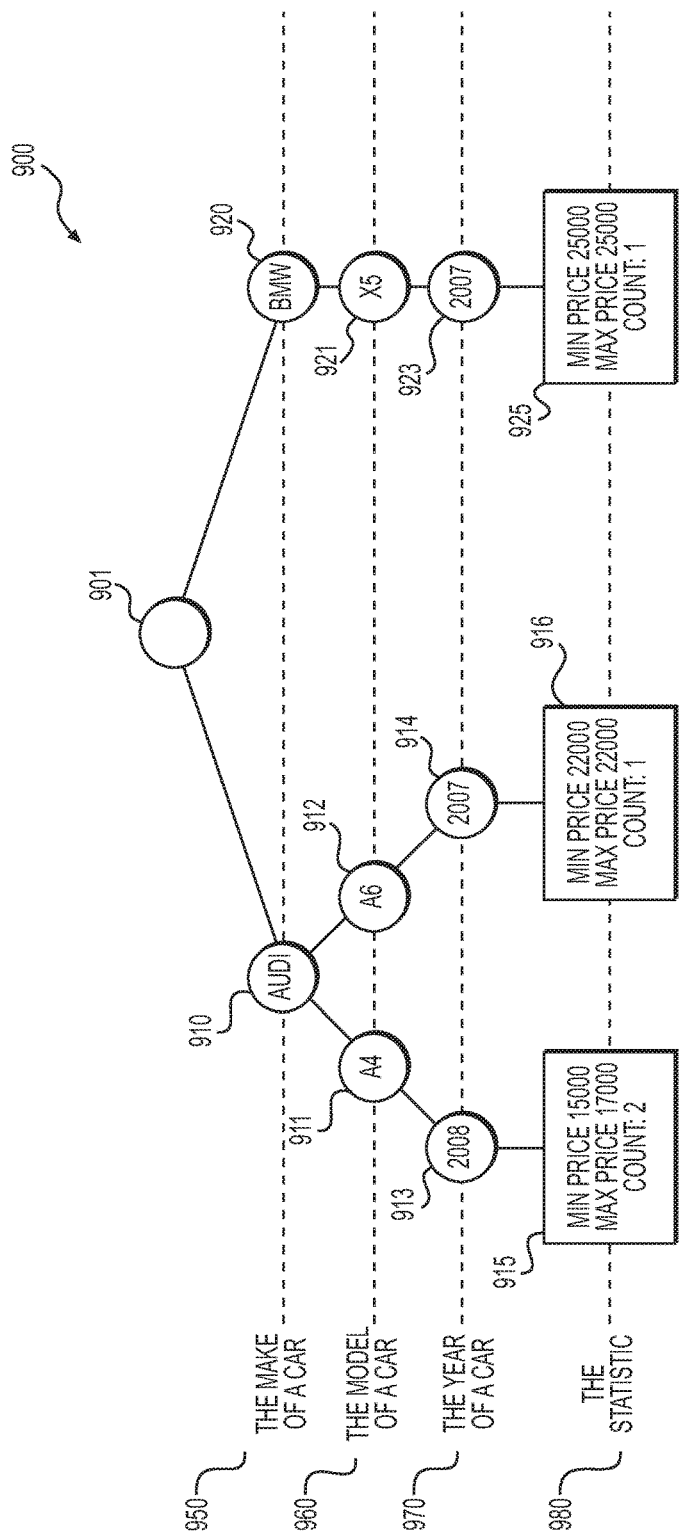
FIG. 8 depicts a schematic diagram of the data tree structure of FIG. 5, the data tree structure depicted during a fourth stage of being populated.

A process for storing a fourth data element with the set of descriptors "BMW"-"X5"-"2007"-"25000"-"grey" is substantially similar to the adding of the first data element that has been described herein above. The result of this process is schematically depicted at FIG. 8.

The routine first checks the first level 950 (associated with the data type "the make of the car") of the data tree 900 to determine if it contains any nodes associated with the descriptor "BMW". As can be seen in the illustration of FIG. 8, there is no such node. Hence, the routine adds a child node

920 to the root 901 at the first level 950 (associated with the data type "the make of the car"), the child node 920 being associated with the descriptor "BMW".

Then, since the routine has created a new node on the first level 950, the remainder of the routine can be substantially similar to the one described above in respect to the first data element (i.e. sequential creation of new child nodes). However, in some other alternative embodiments of the present technology, a search for the child node "X5" of the parent node 920 "BMW" can performed to check if the node "X5" exists. The result of search is negative because the new parent 920 "BMW" has been just added to the first level 950 and there are no any children for this parent. However, as has been mentioned above such a check may be provided in some non-limiting implementations of present technology (with multi-thread processes and the like).

Hence, a node 921 associated with the descriptor "X5" is added on the second level 960. Same process is repeated for the third level 970 and a child node 923 associated with the descriptor "2007" is added to the third level 970.

Then the routine creates a leaf 923 at the fourth level 980 of the data tree 900 as a child to the parent node 925 "2007". According to the embodiments of the present technology, the leaf 925 is configured to store a statistical snapshot for data elements, associated with the set of descriptors "BMW", "X5", "2007" or, in other words, stored in a branch defined by the root 901, the node 920, the node 921 and the node 923.

As an illustration, the leaf 923 stores three statistical parameters: minimum and maximum values of the descriptor "the price of the car" and a number of data elements. Obviously at this stage both the minimum value and the maximum value are equal to the "25000" and the number of data elements is equal to "1".

Even though the above process of building the data tree 900 has been described using three data elements, in practicality, the routine can be repeated a number of times for populating the data tree 900.

The data tree 900 building described above may be performed after the first launching of the system. A similar routine can be performed during updating of the data tree 900. The updating is substantially similar to the first building of the data tree 900. This process of updating can be launched automatically or manually. The automatic updating may be initiated, for example, in response to receiving an indication of a new data element. If, for example, the new data element is received by index receiver 461 and saved in the index storage 463, the index tree manager 465 can trigger execution of the updating process. Alternatively, the updating process can be triggered upon accumulation, by the index storage 463, of a pre-determined number of new or updated feeds. Finally, this automatic process may be run according to the schedule, saved, for example, in the index tree manager 465.

Now that the process of populating and updating of the data tree 900 has been described, a process of searching for the information by using the data tree 900 will be explained.

This process is performed in response to receiving a search query. As mentioned above the search query can be initiated by the user of the electronic device 102 using the search application 104 and transferred via communication network 114 to the search engine 130 (see FIG. 1).

The search query is then transmitted to the searcher 467 to perform a search in the index tree storage 465. Several examples of the searching process will now be described.

As a first example, let it be assumed that the searcher 467 received a search query, which search query when parsed by the searcher 467 is determined to contain the keywords "Audi"-"A6"-"2007". The keywords may be retrieved from the query in different ways, for example, by parsing and subsequent matching words from the query with predefined patterns describing "the make of the car", "the model of the car" and "the year of the car" (noting that the original search query may contain a number of non-meaningful search parameters: "to buy a6 audi new or used", "used audi model a6 buy official dealership only", etc).

The searching routine (which can be performed by the searcher 467) begins at the first level 950 associated with the data type "the make of the car", so the first descriptor associated with this data type is retrieved from the plurality of descriptors "Audi"-"A6"-"2007". In the example the descriptor of this type is "Audi".

Then the searching routine checks the nodes of the first level 950 for an existence of a node associated with the descriptor "Audi". For this purpose a first descriptor associated with a first node at first level 950 is retrieved and matched with the descriptor "Audi". If the result is negative, a next node of the first level 950 is checked. This procedure is executed until such node that matches the descriptor "Audi" is found or until all nodes on the first level 950 are checked (and no match is found).

In the example illustrated herein, the node 910 is identified as the one being associated with the descriptor "Audi".

The searching routine then checks the child nodes of the node 910 located at the second level 960. The second level 960 is associated with the data type "the model of the car", so the second descriptor associated with this data type is retrieved from the parsed search query key words. In the example the descriptor "A6" is retrieved. Then, the search routine checks for any child at the second level 960 that contains the descriptor "A6". The search is substantially similar to the search described above in reference to the first level 950.

In the example illustrated herein, the node 912 is identified as the one being associated with the descriptor "A6".

The searching routine then checks the child nodes of the node 912 located at the third level 970. The third level 970 is associated with the data type "the year of the car", so the second descriptor associated with this data type is retrieved from the parsed search query key words. In the example the descriptor "2007" is retrieved. Then, the search routine checks for any child at the third level 970 that contains the descriptor "2007". The search is substantially similar to the search described above in reference to the first level 950 and the second level 960.

In the example illustrated herein, the node 914 is identified as the one being associated with the descriptor "2007".

As mentioned above the leaf in the data tree 900 is configured to store the statistical snapshot associated with the data elements stored in the branch to which the leaf belongs, which is this case to the branch associated with the descriptors "Audi"-"A6"-"2007" (the branch defined by the root 901, the node 910, the node 912 and the node 914).

The searcher 467 then retrieves the statistical snapshot, which in this example contains: (minimum price of the car)=(maximum price of the car)=22000 and (number of cars)=1. The information from the statistical snapshot can be used for generating a quick response or a preview to the search query.

Naturally, the search query may contain other parameters that can be taken into account when generating a response to the search query. For example, the user can enter a query "Audi A6 2007 with a price not higher than 20000" using the query interface 105 or using a graphic element 210 of the descriptors interface 109 (see FIG. 2) to select a filter of the price of the cars she is looking for.

In this case addition descriptor "the price of the car" may be retrieved from the query and taken into account when generating the response to the search query. Several scenarios, are of course possible. For example, the user may have entered the range of prices using the graphic element 210 (see FIG. 2), which means that the search is limited by minimum and maximum values of the sale price. If, on the other hand, only a minimum value is entered, the search will be limited to cars with the price higher than that specified in the search query. If only the maximum value is entered. The search will be limited to cars with the sale price of less than specified amount in the search query.

Depending on how the user has chosen to limit the price ranges for the search in the search query, several scenarios are possible. A few examples are provided for illustration purposes herein below:

- (the price of the car in the search query)<(the minimum price of the car) and an instruction to display search results with the price below the price specified in the search query result in no results being located.
- (the price of the car in the search query)>(the maximum value of the car) and an instruction to display search results with the price above the price specified in the search query results in no results being located.
- (the price of the car in the search query)<(the minimum price of the car) and an instruction to display search results with the price above the price specified in the search query result in all cars in the matching branch being located.
- (the price of the car in the search query)>(the maximum price of the car) and an instruction to display search results with the price below the price specified in the search query result in all cars in the matching branch being located.
- (the minimum price of the car)<(the price of the car in the search query)<(the maximum price of the car) and an instruction to display search results with the price below the price specified in the search query result in all cars in the matching branch with the price between "the minimum price of the car" and "the price of the car" will be located.
- (the minimum price of the car)<(the price of the car in the search query)<(the maximum price of the car) and an instruction to display search results with the price above the price specified in the search query result in all cars in the matching branch with the price between "the price of the car" and "the maximum price of the car" will be located.
- (the minimum price of the car)<(the price of the car in the search query)<(the maximum price of the car) and an instruction to display search results with the price below the price specified in the search query result in all cars in the matching branch with the price between "the minimum price of the car" and "the price of the car" will be located.

Let's consider a second example of searching for the data elements is responsive to the plurality of descriptors "Audi"-"2008" extracted from another search query.

The searching routine begins at the first level 950 associated with the data type "the make of the car". In the example the searching routine retrieves the descriptor of this type from the parsed search query—"Audi". Then, the searching routine examines the nodes of the first level 950 for an existence of a node associated with the descriptor "Audi". This process is substantially similar to the that described above in reference to the first example. As such, the node 910 "Audi" is identified.

The second level 960 is associated with the data type "the model of the car". However, one will appreciate that the search terms extracted from the search query do not contain the descriptor of such type. So, the searching routine extracts all child nodes for the parent node 910 "Audi". In the example there are two child nodes of the parent node 910 "Audi": node 911 "A4" and node 912 "A6".

The third level 970 is associated with the data type "the year of the car", so the third descriptor associated with this data type is be retrieved from the search query. In the example being depicted herein, the descriptor is "2008". Then the search routine examined the child nodes of the parent node 911 "A4" and the parent node 912 "A6". This procedure is similar to the searching for the node 914 "2007" from the first example.

In the second example the child node 913 "2008" exists only for parent node 911 "A4". Hence the searching routine extracts the leaf 915 associated with the node 913. More specifically, the searching routine extracts the statistical snapshot contained in the leaf 915, including (minimum price of the car)=15000, (maximum price of the car)=17000 and (number of cars)=2.

Let's consider a third example of searching for the data elements based on a search query containing "Audi"-"A4"-"A6".

The searching process starts at the first level 950 and the process is substantially similar to the ones described with reference to the previous two examples. As a result, the node 910 is identified.

It will be recalled that the second level 960 is associated with the data type "the model of the car". The searching routine extracts the descriptor associated with this data type from the parsed search query. In the example presented here, there are two descriptors of such types: "A4" and "A6", so the searching routine performs a search of all child nodes of the node 910 for the descriptors "A4" and "A6". The order of search may me different: for example, the searching routine can first search for the descriptor "A4", then the searching routine can search for the descriptor "A6" or vice versa. Alternatively, the searching routine can first perform searches in parallel.

Since both child node 911 "A4" and child node 912 "A6" exist, the searching routine identifies both of them.

The third level 970 is associated with the data type "the year of the car". It is noted that in the example being described herein, the search query did not provide any limitations as to the descriptor "the year of the car". Hence, the searching routine identifies all child nodes of the node 911 and the node 912 (namely, the node 913 and the node 914, respectively).

At the fourth level 980, the searching routine extracts statistical information from the leafs 915, 916 associated with the node 911 and the node 912, respectively. The searching routine then aggregates statistical information contained in the leaf 915 and the leaf 916. Namely, the searching routine calculates the new minimum value and the new maximum value, as well as updates the number of data elements. Hence, in this example, the searching routine creates an aggregated statistical information—the new number of data elements equals to "3", the minimum and the maximum value of "the price of the car" equal to 15000 and 22000 accordingly.

Let's consider a fourth example of searching for the data elements is responsive to the plurality including one descriptor "2007".

The searching routine starts from the first level 950 associated with the data type "the make of the car". In the example being presented herein, there is no descriptor of such data type within the search query. Hence, the searching routine identifies all nodes of the first level 950.

The second level 960 is associated with the data type "the model of the car". Similar to the identifier of the first level 950, the search query contains no identifier of the second level 960. Hence, the searching routine identifies all nodes of the second level 960.

The third level 970 is associated with the data type "the year of the car". The searching routine identifies the descriptor associated with this data type the search query. In the example being presented herein, the search routine identifies the descriptor "2007". Then the search routine examines all the nodes of the third level 970 for the node(s) associated with the descriptor "2007".

In the illustrated example two nodes associated with the descriptor "2007" exist, the node 914 for the parent node 912 "A6" in the second branch and the second one is the node 923 for the parent node 921 "X5" in the third branch. Hence, the searching routine identifies the leafs 916 and 925. Next, the searching routine generates an aggregated statistical information much akin to what has been described above.

The data structure described herein can be implemented in different ways. When designing the data structure, one can bear in mind several considerations. One of the considerations for the design of such a structure is providing a quick search ability. Another consideration, is compactness, as in some implementations the data structure may be transmitted for search to various external services to provide a local search.

The first consideration can be conveniently addressed by object-oriented models, for example, based on Java or Apache Lucene. In such models, each node of the tree structure 900 is an object that stores a descriptor, links to the parent node and slave nodes, as well as additional information such as headings, active fields and so on. However, as a rule, such models do not meet the requirement of compactness. Given the fact that the tree structure can be large and include more than 10 million objects, the relevance of this consideration increases.

In some embodiments, the tree structure 900 can be implemented as a sequential record of cells containing descriptors and an auxiliary data structure for navigation. The recording can be executed by index tree manager 465. Initial data for the construction of the sequential record of cells comes from the index storage 463. The receiving of the initial data and the updates thereto can be initiated automatically by the index tree manager 465 with a specified frequency, such as once per hour. Physically, such a record can be, for example, a file or a database record. Note that the structure, particularities of which are discussed in detail below, is just one possible implementation and other non-limiting embodiments are possible.

Figure 9:
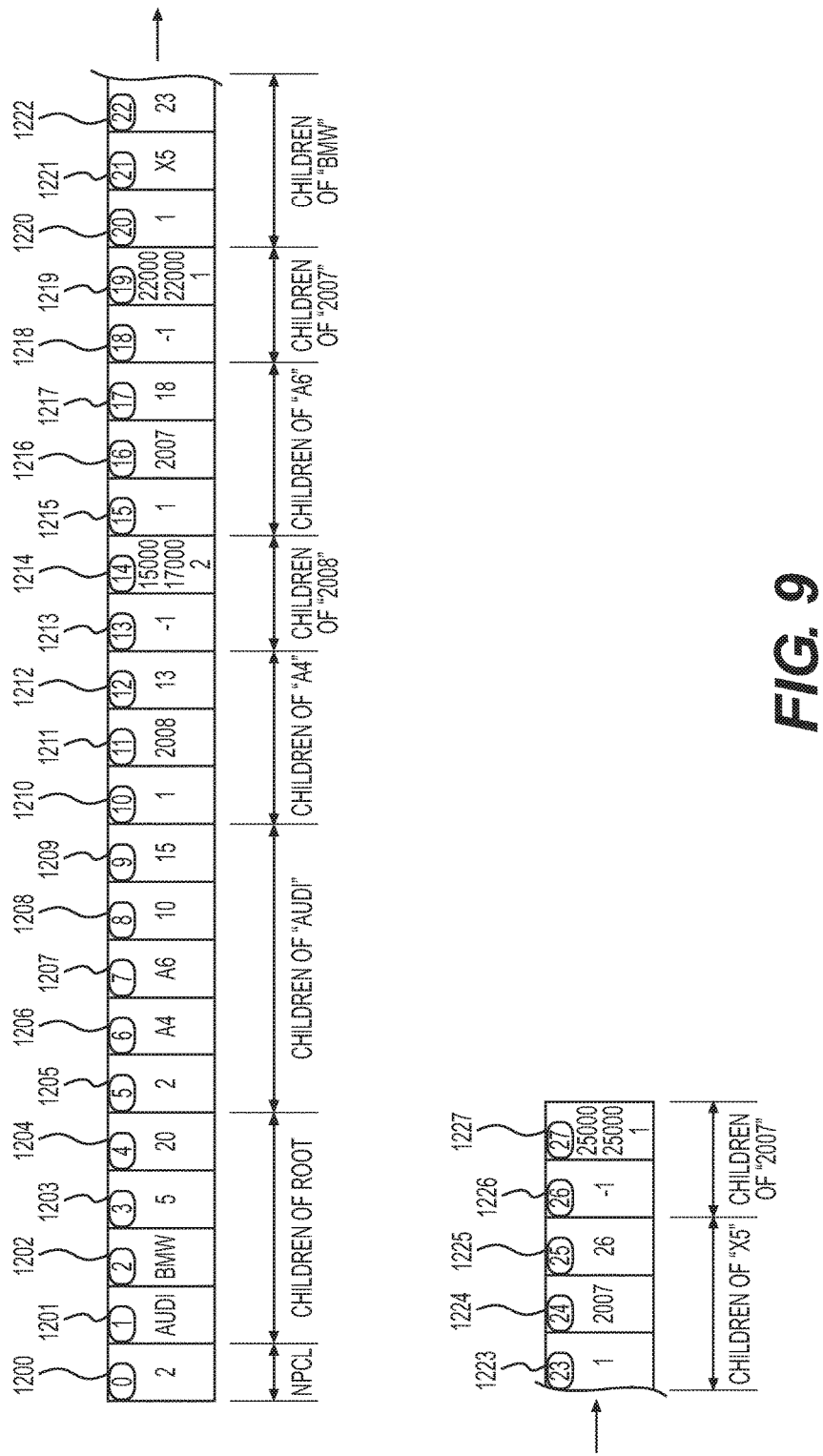
FIG. 9 depicts an example of a sequential data structure, the sequential data structure being an example of a physical data structure that can be used for implementing the data tree of FIG. 8.

With reference to FIG. 9, which depicts an example of the sequential data structure, the process of populating such the sequential data structure will now be described in detail. A first cell 1200 is associated with the root 901 and contains a number of child nodes. In this example, the root 901 contains two child nodes (as is best seen in FIG. 8), so the index tree manager 465 populates the value of the first cell 1200 to be "2".

The index tree manager 465 then populates a second cell 1201 and a third cell 1202, with the associated descriptors of the respective child nodes of the root 901. In this example, the type of descriptors is «the make of the car»; the number of entries (i.e. the number of child nodes) equals to two, so two cells are created, namely the second cell 1201 and the third cell 1202, in which the descriptors «Audi» and «BMW» are populated, respectively. Naturally, the order of entries may be arbitrary (i.e. "Audi" before "BMW" or vice versa). However, in the illustrated example, the second cell 1201 is populated with the «Audi», and the third cell 1202—with the value «BMW».

It is noted that in some implementations the string descriptors, such as «Audi» and «BMW», can be represented as a numerical code. In this scenario, each string descriptor can be pre-associated with a unique numerical identifier. This complicates the process of structure formation, however it can beneficial to reduce the search time, as is it is known by a person skilled in the art, the processing of numerical values is faster than that of string values.

Furthermore, the use of a fixed-size numerical identifier can be beneficial to speed up calculation of the starting position of the following cell from the structure in the memory, because the offset from the end of one cell to the beginning of another equals to the number of bytes occupied by the identifier.

A fourth cell 1203 is designed to store the number of the cell in which the number of the cell associated with its child nodes of the parent node 910 «Audi» is recorded. As will be appreciated, a cell is only populated when the information about the child nodes becomes available and, as such, at a point in time when the data structure is first generated, such fourth cell 1203 may not be created and/or populated. A fifth cell 1204 performs a similar function for the child node «BMW».

In some alternative embodiments, instead of using numbers which allows establishing the relationship between two cells from the memory, the use of links, addresses and other well-known programming techniques is possible. The use of these methods does not limit the scope of this technology and is well known to an ordinary person skilled in the art. Within the embodiments being illustrated here, the various cells (such as the fourth cell 1203, for example) save links that provide the relationship between the cells associated with the nodes in the data tree 900. In the depiction of the data tree 900 (such as FIG. 7 for example) such relationships are denoted by straight lines between the associated nodes of the data tree 900.

As a result of the execution of the described operations in cells 1200-1204, data about first level nodes, that are child nodes to the root 901, is populated: numbers, descriptors, and links. The next step is to record data related to child nodes of the parent node 910.

The node 910 is associated with the descriptor «Audi». In the data tree 900 this node 910 has two child nodes—this triggers creation of a sixth cell 1205. Within the illustrated embodiment, the fourth cell 1203 makes a reference (by means of a link or the like) to the sixth cell 1205, hence once the sixth cell 1205 has been created, its number is added to the third cell 1203 (by means of a link or the like); in this example, the number is "5".

The following two cells, a seventh cell 1206 and an eighth cell 1207, are designed for storing descriptors associated with the child nodes of the parent node 910 «Audi». In this example, the parent node 910 has two child nodes—the child node 911 and the child node 912, so two cells are created in which the descriptors «A4» and «A6» are populated, respectively.

A ninth cell 1208 is designed for storing a link to the cell with a node descriptor associated with a child node of the parent node 911 «A4». At this stage, such a cell has not yet been created so the link to it is populated later, after such cell is created. A similar situation occurs for the tenth cell 1209, which is designed for storing a link to a cell with a descriptor of the child node of the parent node 912 «A6».

The initialization of respective sixth to eighth cells 1205-1207, that are designed to store data associated with nodes 911 «A4» and 912 "A6" from the data tree 900 which are child nodes to the parent node 910 «Audi», is suspended and will be completed after the initialization of the ninth cell 1208 and the tenth cell 1209. The index tree manager 465 then starts recording of data that relates to child nodes of the node 911 «A4».

An eleventh cell 1210 is designed to store the number of children of parent node 911 «A4». In this example, the parent node 911 has one child node 913, therefore the value "1" is stored in the eleventh cell 1210. A link to the eleventh cell 1210 is included in the ninth cell 1208—hence number "10" is stored in the ninth cell 1208. The descriptor of the child node 913, which is "2008", is stored in a twelve cell 1211. A thirteenth cell 1212 is configured to store a link to a list of child nodes of the parent node 913 and since the cells for such child nodes are not yet created, the thirteenth cell 1212 is yet empty.

The parent node 911 «A4» does not contain any additional child nodes, so the next step is the determination of the list of child nodes to the parent node 913 "2008" in the data tree 900. For this purpose, value "−1" is stored in cell 1213. This value is an indication that the next cell—a fifteenth cell 1214 is designed to store a statistical snapshot.

It should be noted, that this method of indication is just one of many possible methods. Predefined numerical, alphanumerical or string values or other well-known programming techniques may be used to identify the list. For example, the designation can be achieved by indicating the number of bytes occupied by cell data, with a minus sign. As shown below, the fifteenth cell 1214 keeps a statistical snapshot consisting of three values: "15000", "17000" and "2". As a result of the recording of the data separated by a comma in a cell, the string consisting of 13 characters, "15000,17000,2", is formed. Accordingly, the string occupies a volume equal to 13 bytes of memory, and the value "−13" is recorded in the fifteenth cell 1214. The number of bytes, an indication of which is stored in the fifteenth cell 1214, may be subsequently used to move from the fourteenth cell 1213 to the sixteenth cell 1215, as it represents an offset between the two cells in the memory.

Further, the number of the fourteenth cell 1213 is stored in the thirteenth cell 1212, and the fifteenth cell 1214 stores the statistical snapshot. In this example, the statistical snapshot includes the minimum and maximum possible values of the descriptor «the price of the car» and the number of elements corresponding to the set of descriptors associated with nodes 910, 911, 913. An example of the calculation of these values was shown above, they are respectively, "15000", "17000" and "2". These values are recorded in the fifteenth cell 1214.

Next, it is necessary to initialize a sixteenth cell 1215, a seventeenth cell 1616 and an eighteenth cell 1217 with data on child nodes of the parent node 912 «A6». In this example, the parent node 912 comprises one child node, so the value "1" is stored in the sixteenth cell 1215. Since the sixteenth cell 1215 which contains the description of the child node to the parent node 912 «A6» is initialized, its number can be stored in the tenth cell 1209; in this example, the number is "15". Next, the descriptor of node 914 is stored in the seventeenth cell 1216, in this example, the descriptor is "2007". The eighteenth cell 1217 is created for determining the relationship with the child node of the parent node 914.

The child node of the parent node 914 is a list, so the next step is to create a nineteenth cell 1218 and populate it with the value "−1". As indicated above, this value is used as a reference to a list in the structure of FIG. 9. In other implementations, other methods may be employed for designating a list. A link to the nineteenth cell 1218 is stored in the eighteenth cell 1217, which is thus populated with the value "18".

A twentieth cell 1219 is designed to store a statistical snapshot. This cell records a minimum and a maximum value of the descriptor «the price of the car» and the number of elements associated with a set of descriptors of nodes 910, 912, 914, that is, «Audi»-«A6»-«2007». According to this example, these values equal to "22000", "22000" and "1", respectively.

As a result of these steps, the data structure describing the first and second branches of the data tree 900 (namely, nodes 910-911-913-915 and nodes 910-912-914-917) is populated. The subsequent process is designed to record data related to the third branch, which consists of nodes 920-921-923-925. This process is substantially similar to that described above.

A twenty first cell 1220 is configured to store the child nodes of the parent node 920. In this example, the node 920 has one child node, and therefore the value "1" is stored in the twenty first cell 1220. After initialization, a link to this cell is established in the fifth cell 1204—in the example being presented herein, the number "20" is populated into the fifth cell 1204.

A twenty second cell 1221 is configured to store descriptor of the child node of the parent node 920; in this example, the value is «X5». Finally, a twenty third cell 1222 is created, but is left empty, since it must have a link to the initial cell (to be created below) with data on child nodes of the parent node 921.

A twenty fourth cell 1223 is configured to store data associated with child nodes of the parent node 921. As can be gathered from the data tree 900, value "1" is stored in the twenty fourth cell 1223. After initialization, a link to this cell, which number is "23", is stored in the twenty third cell 1222. A twenty fifth cell 1224 is created for the descriptor "2007", and a twenty sixth cell 1225 is created for a link to the cell with data on child nodes of the parent node 923. The twenty sixth cell 1225 is populated with the number "26" from a twenty seventh cell 1226 which contains a list identifier "−1".

A twenty eighth cell 1227 is configured to store a statistical snapshot associated with the set of descriptors of nodes 920, 921, 923, which are «BMW»-«X5»-«2007». According to this example, the statistical snapshot includes values "25000", "25000" and "1" corresponding to the minimum and maximum values of the descriptor «the price of the car» and the number of elements.

The process of constructing the physical structure of data corresponding to the data tree 900 has now been completed. The structure may be stored in the index tree storage 465 and used for searching. The process of finding using the so-populated structure will now be illustrated by examples.

As a first example, a query that contains the descriptors "Audi"-"A6"-"2007" will be used. The search begins with the first cell 1200 of the structure shown in FIG. 9. The value from the first cell 1200 is retrieved—in this example it is "2". The index tree manager 465 analyzes the retrieved value and appreciates that the following two cells contain descriptors. According to the embodiments of the technology, types of descriptors and their sequence in the structure are predetermined, and in this example the first type of descriptors to be analyzed is «the make of the car». So first, a descriptor of this type is extracted from the query, i.e. "Audi", and a search is performed on the next two cells. The index tree manager 465 appreciates that descriptor from the search query matches the descriptor stored in the second cell 1201.

Once the match for the descriptor "Audi" is found, the index tree manager 465 locates cells that contain descriptors of the following predefined type, i.e. «the model of the car». The index tree manager 465 appreciates that the fourth cell 1203 and the fifth cell 1204 store this type of descriptors. As can be appreciated from the illustration of FIG. 9, the fourth cell 1203 and the fifth cell 1204 are sequentially organized within the structure of FIG. 9, just akin to the second cell 1201 and the third cell 1202. Therefore, the index tree manager 465 appreciates the number of the fourth cell 1203 by retrieving its number stored in the second cell 1201 with the descriptor "Audi". The index tree manager 465 then obtains, from the fourth cell 1203, the link "5" that refers to the sixth cell 1205 and accesses the sixth cell 1205.

A search for the next descriptor of the predefined type is performed, in this example it can be a descriptor of the type «the model of the car». The procedure is similar to the one described above. The value "2" is extracted from the sixth cell 1205 and it indicates to the index tree manager 465 that the descriptors are contained in the two following cells—the seventh cell 1206 and the eighth cell 1207. The descriptors are extracted from the seventh cell 1206 and the eighth cell 1207. The index tree manager 465 then compares the extracted descriptors with the descriptor «A6» that has been obtained from the search query. In this example, the descriptor «A6» is matched with the descriptor stored in the eighth cell 1207. Then, the index tree manager 465 transitions to the tenth cell 1209, where the link «15» is retrieved.

A sixteenth cell 1215 (associated with the number "15") contains the value "1", meaning that only one following cell in the structure contains a descriptor, i.e. the seventeenth cell 1216. The seventeenth cell 1216 contains a descriptor of the type «the year of the car». Descriptor "2007" is extracted from the seventeenth cell 1216, and is compared with a descriptor of the same type from the received query. The descriptors match each other, so the index tree manager 465 proceeds to the nineteenth cell 1218.

The value of "−1", which is extracted from the nineteenth cell 1218, signifies that the next cell (i.e. the twentieth cell 1219) contains a statistical snapshot. Therefore, the index tree manager 465 proceeds to the twentieth cell 1219 and extracts therefrom the minimum and maximum values of the descriptor «the price of the car» and the number of elements, i.e., "22000", "22000" and "1", respectively. Thus, the statistics about the query "Audi"-"A6"-"2007" are extracted.

As another example, let's consider a query that contains a single descriptor "Audi". The search step in the structure for the descriptor "Audi" is similar to the first example illustrated above. Its implementation involves a successive transition through cells 1200-1201-1203-1205. Further steps are somewhat different due to the fact that the descriptor of the type «model of the car» does not appear in the query. Therefore, all the descriptors of the given type related to the descriptor "Audi" are analyzed; those are the ones maintained in the eight cell 1207 and the ninth cell 1208.

The ninth cell 1208 contains the descriptor associated with "A6". The procedure for obtaining statistical snapshot is similar to the one described above and is executed as a result of the transitions through the cell chain 1207-1209-1215-1216-1217-1218-1219. It is noted that the sixteenth cell 1215 contains the value "1", therefore a single descriptor of the type «the year of the car», stored in the seventeenth cell 1216, is analyzed.

In the presence of other descriptors of the given type, the index tree manager 465 would have obtained their statistical snapshots as well. Resulting from the transition execution is the twentieth cell 1219, from which a statistical snapshot is retrieved, the statistical snapshot being for all models "Audi A6" produced in 2007, i.e. "22000", "22000" and "1".

The tenth cell 1209 contains the descriptor associated with «A4». According to the same logic as presented above for the transitioning between cells in the structure of FIG. 9, the index tree manager 465 moves through the cell chain 1206-1208-1210-1211-1212-1213-1214 to obtain a statistical snapshot. Resulting from the analysis, a statistical snapshot from fifteenth cell 1214 containing "15000", "17000" and "2" will be acquired.

The statistical snapshot collected from the twentieth cell 1219 and the fifteenth cell 1214 are to be aggregated. The operation can be performed, for example, by the index tree manager module 465. The aggregation involves calculating the minimum and maximum values of the descriptor—in this example, the descriptor is «price of the car»—as well as calculating the sum of the number of elements in these cells.

Obviously, as a result of the aggregation for the example given query is a minimum value of "15000", a maximum value of "22000" and the number of elements is equal to "3".

As a third example, let's consider the query "Audi"-"2008" comprising two descriptors. The search starts with the first cell 1200 and it's no different from the first example for the descriptor «Audi». A transition through the cell chain 1200-1201-1203-1205 is executed as a result of the search for the given descriptor.

The descriptor of the type «model of the car» is not present in the query, therefore it is necessary to analyze all descriptors related to the descriptor "Audi" which are located in cells 1206-1207. A transition from the seventh cell 1206, containing the descriptor "A4", to the ninth cell 1208, containing a link to the eleventh cell 1210, is executed.

In the eleventh cell 1210 the value "1" is stored indicative for the index tree manager 465 to analyze a single descriptor of the type «year of the car» in the next cell. This descriptor is acquired from the twelve cell 1211 and is compared with the descriptor "2008" extracted from the search query. Since the descriptors match, a transition is executed to the next cell, namely the thirteenth cell 1212, containing a link to the fourteenth cell 1213, and further to the fifteenth cell 1214, from which the statistical snapshot is retrieved.

Next, from the eighth cell 1207 with the descriptor "A6" a transition to the tenth cell 1209, which contains a link to the sixteenth cell 1215, is performed. The value "1" is retrieved from the sixteenth cell 1215, which is indicative to the index tree manager 465 that only one descriptor of the type «year of the car» is maintained in the next cell. This descriptor "2007" is extracted from the seventeenth cell 1216 and is compared with the query descriptor "2008". Since these descriptors do not match, the search process for statistical snapshot elements, that satisfy the set of descriptors «Audi»-«A6»-«2008», is interrupted.

Thus, the search results for "Audi"-"2008" is a statistical snapshot comprising the values "15000", "17000" and "2".

Naturally, the structure depicted in FIG. 9 allows for handling of more complex queries, for example, the minimum price of all car brands «Audi» and «BMW» released in 2007. Processing such a query involves getting a statistical snapshot for the set of descriptors «Audi»-«BMW»-«2007».

First, descriptors that are compared with query descriptors of the type «the make of the car» are extracted from the second cell 1201 and the third cell 1202. The query contains descriptors «Audi» and «BMW» and both are present in the structure. Statistical snapshots for elements containing the descriptors «Audi»-«2007» are obtained from the twentieth cell 1219 as a result of subsequent transitions through the cell chain 1200-1201-1203-1205-1207-1209-1215-1216-1217-1218-1219. Statistical snapshots for elements containing the descriptors «BMW»-«2007» are obtained from the twenty eighth cell 1227 as a result of subsequent transitions through the cell chain 1200-1202-1204-1220-1221-1222-1223-1224-1225-1226-1227.

Naturally, the structure depicted in FIG. 9 needs to be updated as the new information becomes available (much akin to what was described above). Just as an example, addition of an element with descriptors «Audi»-«A4»-«2008»-"18000" will change the maximum price value to "18000" and the number of elements to "3" in the fifteenth cell 1214.

By the same token, addition of an element with descriptors «Audi»-«A4»-«2008»-"14000" will change the minimum price value to "14000" and the number of elements to "3" in the fifteenth cell 1214.

In the case of addition of elements associated with the descriptors that were not previously recorded in the structure of FIG. 9, new cells can be created in addition to the existing cells or overwriting the existing cells. The index tree manager 465 receives the index from the index storage 463 and builds the structure shown in FIG. 9, as described above. During construction, the current structure, stored in the index tree storage 465, is used to perform the search. When the process of construction ends, the new structure begins to be used for searching and the old one is deleted.

Figure 10:
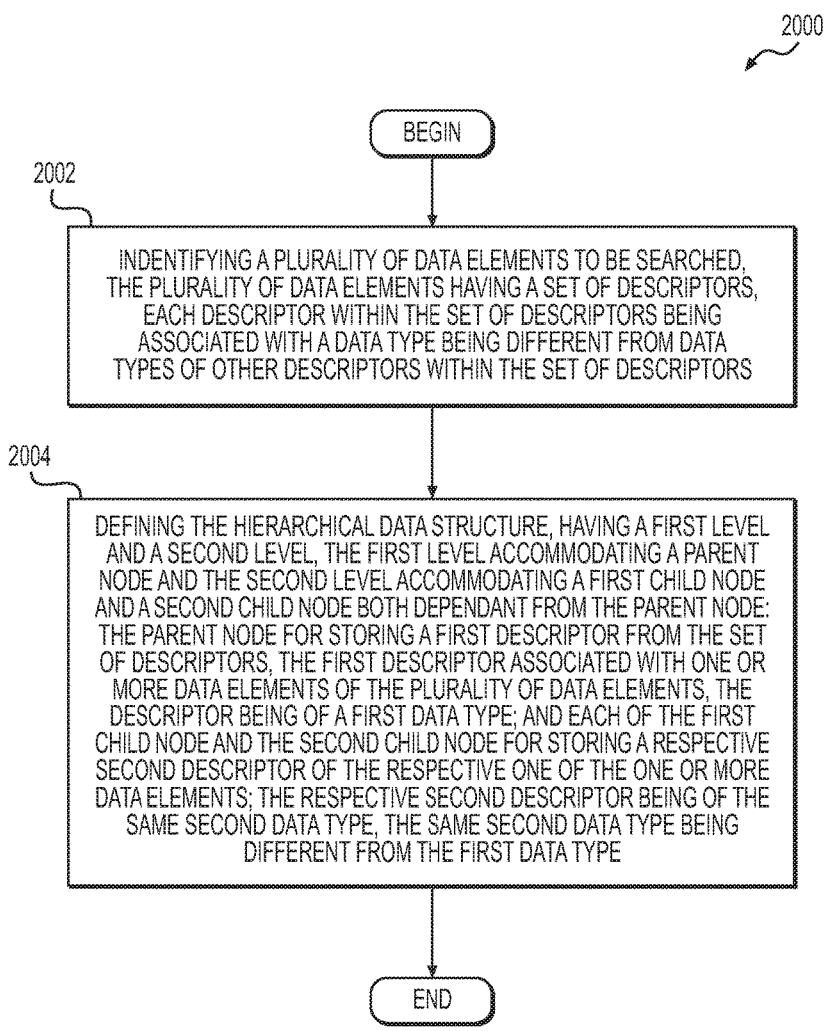
FIG. 10 depicts a block diagram of a method, the method being executed in accordance with non-limiting embodiments of the present technology.

Given architecture described herein above, it is possible to execute a computer-implemented method for generating a hierarchical data structure. With reference to FIG. 10, there is depicted a block diagram of a method 2000, the method 2000 being executed in accordance with non-limiting embodiments of the present technology. The method 2000 can be conveniently executed by the index tree manager 465 (also referred to herein below as the server).

Step 2002—identifying a plurality of data elements to be searched, the plurality of data elements having a set of descriptors, each descriptor within the set of descriptors being associated with a data type being different from data types of other descriptors within the set of descriptors The method 2000 starts at step 2002, where the index tree manager 465 identifies a plurality of data elements to be searched, the plurality of data elements having a set of descriptors, each descriptor within the set of descriptors being associated with a data type being different from data types of other descriptors within the set of descriptors.

Step 2004—defining the hierarchical data structure, having a first level and a second level, the first level accommodating a parent node and the second level accommodating a first child node and a second child node both dependent from the parent node: the parent node for storing a first descriptor from the set of descriptors, the first descriptor associated with one or more data elements of the plurality of data elements, the descriptor being of a first data type; and each of the first child node and the second child node for storing a respective second descriptor of the respective one of the one or more data elements; the respective second descriptor being of the same second data type, the same second data type being different from the first data type The method 2000 then proceeds to step 2004, where the index tree manager 465 defines the hierarchical data structure, having a first level and a second level, the first level accommodating a parent node and the second level accommodating a first child node and a second child node both dependent from the parent node: the parent node for storing a first descriptor from the set of descriptors, the first descriptor associated with one or more data elements of the plurality of data elements, the descriptor being of a first data type; and each of the first child node and the second child node for storing a respective second descriptor of the respective one of the one or more data elements; the respective second descriptor being of the same second data type, the same second data type being different from the first data type.

It should be expressly understood that not all technical effects mentioned herein need to be enjoyed in each and every embodiment of the present technology. For example, embodiments of the present technology may be implemented without the user enjoying some of these technical effects, while other embodiments may be implemented with the user enjoying other technical effects or none at all.

The invention claimed is:

1. A computer-implemented method for generating a multi-level hierarchical data tree structure and searching data therein, the hierarchical data structure having at least a first level, a second level, and a leaf level, the computer-implemented method executable at a server, the computer-implemented method comprising:

receiving, by a partitioner at the server, a plurality of data elements, the plurality of data elements having a set of descriptors, each descriptor within the set of descriptors being associated with a data type being different from data types of other descriptors within the set of descriptors;

generating, by an index tree manager at the server, the multi-level hierarchical data tree structure for storing elements of the plurality of data elements of the same type, the plurality of data elements having a common root, the first level accommodating a parent node, the second level accommodating a first child node and a second child node both dependent from the parent node, and the leaf level accommodating a first leaf node and second leaf node each dependent of the respective first child node and the second child node;

the parent node for storing a first descriptor from the set of descriptors, the first descriptor associated with one or more data elements of the plurality of data elements, the descriptor being of a first data type;

each of the first child node and the second child node for storing a respective second descriptor of the respective one of the one or more data elements; the respective second descriptor being of the same second data type, the same second data type being different from the first data type; and each of the first leaf node and second leaf node for storing a respective statistical snapshot, each of the first and second leaf node comprising a plurality of third descriptors of different third data types being different from the first and second data type, the third data type being at least one of:

(i) a data element count associated with its respective branch, and (ii) a lowest minimum and highest maximum value associated with the one or more data element stored therein;

recording, at an index tree storage by the index tree manager at the server, the multi-level hierarchical tree structure into a sequential linear data structure, the sequential linear data structure being implemented as a sequential record of cells having descriptors and an auxiliary data structure for navigation, the auxiliary data structure including:
  a number of child nodes of the parent node,
  a number of leaf nodes of each of the child nodes, and
  at least one offset between two cells of the sequential record of cells and at least one link between two non-contiguous cells of the sequential record of cells for direct navigation therebetween;
receiving, by a searcher at the server from an electronic device, a search query having a search parameter, the search parameter being associated with a search data type;
navigating, by the index tree manager at the server, using the at least one offset through the cells of the sequential linear data structure using the auxiliary data structure and comparing, by the server, the search parameter with the descriptors of the sequential record of cells to identify a statistical snapshot cell storing a statistical snapshot, the statistical snapshot cell associated with a leaf node associated with a branch of the hierarchical data structure, the branch comprising at least one node associated with a descriptor being of the same data type as the search data type, the descriptor matching with the search parameter;
accessing, by the index tree manager at the server, the statistical snapshot cell having at least one data element being associated with the descriptor;
retrieving, by the index tree manager at the server, the at least one data element from the statistical snapshot cell; and
causing, by the server, the electronic device to display the at least one data element retrieved from the statistical snapshot cell.

2. The method of claim 1, the parent node being a first parent node, and wherein the defining the hierarchical data structure further comprises defining a second parent node for storing a descriptor from the set of descriptors; the descriptor being different from the descriptor of a first parent node; both descriptors being of the same first data type.

3. The method of claim 2, the defining the hierarchical data structure further comprises defining a third child node and a fourth child node, both dependent from the second parent node; each of the third child node and the fourth child node for storing a respective other descriptor of the other ones of the one or more data elements; the respective other descriptor being of the same second data type.

4. The method of claim 1, the defining the hierarchical data structure is executed in response to receiving an indication of a data element of the plurality of data elements of the same type, the data element to be indexed in the hierarchical data structure, the data element associated with the set of descriptors, the set of descriptors having a first descriptor and a second descriptor.

5. The method of claim 4, wherein in response to receiving an indication of the data element being associated with the first descriptor being of the first data type the defining comprises identifying the parent node at the first level of the hierarchical data structure.

6. The method of claim 5, wherein in response to receiving an indication of the data element being associated with the second descriptor being of the second data type, the defining comprises identifying the first child node at the second level of the hierarchical data structure.

7. The method of claim 5, wherein the data element is the first data element and wherein in response to receiving an indication of a second data element being associated with a second descriptor being of the second data type, the second descriptor being the different from the second descriptor of the first data element the defining comprises identifying the second child node at the second level of the hierarchical data structure.

8. The method of claim 5, wherein the parent node is the first parent node, and wherein in response to receiving an indication of the second data element associated with a descriptor being different from the first descriptor; both descriptors being of the same first data type, the defining further comprises identifying a second parent node at the first level of the hierarchical data structure.

9. The method of claim 4, wherein in response to receiving an indication of the data element being associated with the first descriptor being of the first data type, the second descriptor being of the second data type and the third descriptor being of the third data type, the defining further comprises identifying a first leaf node being associated with the first child node; the first leaf node for storing the third descriptor.

10. The method of claim 9, wherein the data element is the first data element, and wherein in response to receiving an indication of a second data element being associated with the same first descriptor and the same second descriptor as the first data element, but a different third descriptor of the same third data type, the defining further comprises associating the second data element with the first leaf node.

11. The method of claim 10, further comprising updating the first leaf node with a statistical snapshot of the third descriptor of the first data element and the different third descriptor of the second data element.

12. The method of claim 10, wherein in response to receiving an indication of a third data element being associated with the same first descriptor and the same second descriptor as both the first and second data elements, but a different third descriptor of the same third data type, the defining further comprises associating the third data element with the first leaf node.

13. The method of claim 12, further comprising updating the statistical snapshot with information associated with the third data element.

14. The method of claim 13, wherein the updating comprises: (i) updating a count within the number of data elements, (ii) determining if the indication of the minimum value and the maximum value needs to be updated based on the value of a third descriptor of the third data element.

15. The method of claim 14, wherein the determining if the indication of the minimum value and the maximum value needs to be updated comprises checking if the value of the third descriptor falls within a range defined between the minimum value and the maximum value, and, in response to the value of the third descriptor being outside of the range defined between the minimum value and the maximum value, modifying the range to include the value of the third descriptor.

16. The method of claim 15, wherein responsive to the value of the third descriptor falling outside one of the minimum value and the maximum value, changing the respective one of the minimum value and the maximum value to the value of the third descriptor of the third data element.

17. The method of claim 9, wherein the data element is the first data element, and wherein in response to receiving an indication of a fourth data element being associated with the same first descriptor and a second descriptor being of the same second data type but being different from the second descriptor of the first data element, and a third descriptor being of the same third data type, the defining further comprises identifying a second leaf node being associated with the second child node; the second leaf node for storing the third descriptor associated with the fourth data element.

18. A server configured to generate a multi-level hierarchical data tree structure and searching data therein, the hierarchical data structure having at least a first level, a second level, and a leaf level, the server comprising non-transient storage medium for storing computer-executable instructions, which instructions when executed are configured to render the server operable to:

receive, at a partitioner via a communications network, a plurality of data elements, the plurality of data elements having a set of descriptors, each descriptor within the set of descriptors being associated with a data type being different from data types of other descriptors within the set of descriptors;

generate, at an index tree manager, the multi-level hierarchical data tree structure for storing elements of the plurality of data elements of the same type, the plurality of data elements having a common root, the first level accommodating a parent node, the second level accommodating a first child node and a second child node both dependent from the parent node, and the leaf level accommodating a first leaf node and second leaf node each dependent of the respective first child node and the second child node;

the parent node for storing a first descriptor from the set of descriptors, the first descriptor associated with one or more data elements of the plurality of data elements, the descriptor being of a first data type;

each of the first child node and the second child node for storing a respective second descriptor of the respective one of the one or more data elements; the respective second descriptor being of the same second data type, the same second data type being different from the first data type;

each of the first leaf node and second leaf node for storing a respective statistical snapshot, each of the first and second leaf node comprising a plurality of third descriptors of different third data types being different from the first and second data type, the third data type being at least one of: (i) a data element count associated with its respective branch, and (ii) a lowest minimum and highest maximum value associated with the one or more data element stored therein;

record, at an index tree storage, the multi-level hierarchical tree structure into a sequential linear data structure, the sequential linear data structure being implemented as a sequential record of cells having descriptors and an auxiliary data structure for navigation, the auxiliary data structure including:

a number of child nodes of the parent node, a number of leaf nodes of each of the child nodes, and at least one offset between two cells of the sequential record of cells and at least one link between two non-contiguous cells of the sequential record of cells for direct navigation therebetween;

receive, at a searcher from an electronic device via the communications network, a search query having a search parameter, the search parameter being associated with a search data type;

navigate, by the index tree manager, using the at least one offset through the cells of the sequential linear data structure using the auxiliary data structure and compare the search parameter with the descriptors of the sequential record of cells to identify a statistical snapshot cell storing a statistical snapshot, the statistical snapshot cell associated with a leaf node associated with a branch of the hierarchical data structure, the branch comprising at least one node associated with a descriptor being of the same data type as the search data type, the descriptor matching with the search parameter;

access, by the index tree manager, the statistical snapshot cell having at least one data element being associated with the descriptor;

retrieve, by the index tree manager, the at least one data element from the statistical snapshot cell; and cause, over the communications network, the electronic device to display the at least one data element retrieved from the statistical snapshot cell.

\* \* \* \* \*